(12) United States Patent
Schnitt

(10) Patent No.: US 8,667,383 B2
(45) Date of Patent: Mar. 4, 2014

(54) UNIFIED ELECTRONIC FORMS MANAGEMENT SYSTEM

(76) Inventor: David Schnitt, Rancho Palos Verdes, CA (US)

(*) Notice: Subject to any disclaimer, the term of this patent is extended or adjusted under 35 U.S.C. 154(b) by 0 days.

(21) Appl. No.: 13/044,520

(22) Filed: Mar. 9, 2011

(65) Prior Publication Data

US 2011/0225485 A1    Sep. 15, 2011

Related U.S. Application Data

(60) Provisional application No. 61/311,777, filed on Mar. 9, 2010.

(51) Int. Cl.
*G06F 17/00* (2006.01)
*G06F 15/16* (2006.01)

(52) U.S. Cl.
USPC ........... 715/222; 715/224; 715/234; 715/760; 709/201; 709/203

(58) Field of Classification Search
USPC ......... 715/200, 201, 202, 204, 205, 221, 222, 715/223, 224, 225, 226, 234, 243, 253, 254, 715/255, 273, 274, 700, 760, 780; 709/201, 709/203, 217, 218, 219
See application file for complete search history.

(56) References Cited

U.S. PATENT DOCUMENTS

| | | | |
|---|---|---|---|
| 6,507,865 B1 | 1/2003 | Hanson et al. | |
| 6,832,349 B1 | 12/2004 | Seamans | |
| 6,968,500 B2 | 11/2005 | Mikhailov et al. | |
| 7,171,615 B2 | 1/2007 | Jensen et al. | |
| 7,281,018 B1 * | 10/2007 | Begun et al. | 1/1 |
| 7,313,757 B2 | 12/2007 | Bradley et al. | |
| 7,376,891 B2 | 5/2008 | Hitchock et al. | |
| 7,496,837 B1 * | 2/2009 | Larcheveque et al. | 715/237 |
| 7,590,931 B2 | 9/2009 | Pahl | |
| 7,607,078 B2 | 10/2009 | Geva et al. | |

(Continued)

FOREIGN PATENT DOCUMENTS

| | | |
|---|---|---|
| CA | 2381832 | 10/2002 |
| EP | 0451485 | 10/1991 |

(Continued)

OTHER PUBLICATIONS

International Search Report of Counterpart PCT Application No. PCT/US2011/027792.

(Continued)

*Primary Examiner* — Maikhanh Nguyen
(74) *Attorney, Agent, or Firm* — Liu & Liu

(57) ABSTRACT

A unified electronic forms management system that comprises a network-based software implemented process that is designed to provide its users with access to a unified system and process of managing form data and the creation, storage, update and distribution of electronic forms. The unified electronic forms management system may include a centralized and unified electronic forms management system remote server, which communicates over a network with a remote form designer used by a user to create a form, a remote form viewer used by a form user, a database that stores the form data associated with the remote server, and external database(s) that optionally receive data transmitted by the unified system. Form recipient(s) have the option of receiving over the network the form for approval and/or to provide additional information.

22 Claims, 33 Drawing Sheets

(56) References Cited

U.S. PATENT DOCUMENTS

| | | | |
|---|---|---|---|
| 7,644,351 | B1* | 1/2010 | Portnoy et al. ............... 715/226 |
| 7,669,116 | B2 | 2/2010 | Lopata et al. |
| 2003/0110443 | A1* | 6/2003 | Yankovich et al. ........ 715/501.1 |
| 2004/0205534 | A1 | 10/2004 | Koelle |
| 2004/0216039 | A1* | 10/2004 | Lane et al. .................... 715/511 |
| 2005/0060234 | A1* | 3/2005 | Reahard ........................ 705/19 |
| 2005/0091166 | A1 | 4/2005 | Seamans |
| 2006/0136810 | A1 | 6/2006 | Truong et al. |
| 2007/0124665 | A1 | 5/2007 | Jensen et al. |
| 2007/0129987 | A1 | 6/2007 | Hauser et al. |
| 2007/0180148 | A1* | 8/2007 | Yadidian ....................... 709/246 |
| 2007/0198910 | A1 | 8/2007 | Jensen et al. |
| 2008/0091846 | A1* | 4/2008 | Dang ............................ 709/246 |
| 2008/0098291 | A1 | 4/2008 | Bradley et al. |
| 2009/0070166 | A1* | 3/2009 | Lashus et al. .................... 705/7 |
| 2009/0083616 | A1 | 3/2009 | Ali et al. |
| 2009/0328149 | A1* | 12/2009 | Lyons et al. ...................... 726/3 |
| 2010/0011280 | A1 | 1/2010 | Cheeniyil et al. |
| 2010/0251092 | A1* | 9/2010 | Sun ............................... 715/221 |
| 2010/0318889 | A1* | 12/2010 | Billharz et al. ............... 715/212 |
| 2011/0035654 | A1* | 2/2011 | Wright et al. ................. 715/221 |

FOREIGN PATENT DOCUMENTS

| | | |
|---|---|---|
| JP | 2004213075 | 7/2004 |
| JP | 2007047935 | 2/2007 |
| JP | 2007219774 | 8/2007 |
| JP | 2008040589 | 2/2008 |
| WO | 2007/086075 | 8/2007 |

OTHER PUBLICATIONS

Adobe Systems Inc: "Adobe TM LiveCycle Designer", Internet Citation, URL: http://www.adobe.com/enterprise/pdfs/xml_form_designer_faq.pdf, Dec. 2004.

Oasis-Robin Cover Edition: "Enhanced Adobe XML Architecture Supports XML/PDF Form Designer & XML Data Package (XDP)", Internet Citation, URL: http://xml.coverpages.org/ni2003-07-15-a.html, Jul. 15, 2003.

Adobe System Inc.: "Adobe TM Intelligent Document Platform for IBM TM WebSphere", Internet Citation, URL: http://partners.adobe.com/public/developer/en/ibm/ibm_overview/pdf?ibmd, Jun. 2004.

* cited by examiner

NOTE: Some of the controls listed below are proprietary
- Text
- Button (push/rollover)
- Check box (multiple styles)
- Checkbox group
- Drop down (defaults, use defined list, grab from external Remote Server, allow one or multiple selections)
- List box
- Combo box
- Radio button
- Radio button group
- Date
- Time
- Calendar
- Numeric stepper
- Table with controls to resize by user
- Password input
- Browse to attach file
- Picture (browse to attach file or grab from external Remote Server)
- Image
- Handwritten field (to be used with a tablet)
- Movie
- Sound
- URL link
- Progress bar
- Timer
- Ranking
- Print button
- Captcha
- Digital signature image
- Barcode (multiple types)
- Page number
- Time and date stamp
- Sliders (vertical and horizontal)
- Save data button
- Submit button - send data or not, user copy, message when sent, redirect to url, redirect to other form, reopen same form with blank fields)
- Form and field validations
- Required fields
- Field sequence
- External data grab
- Field validations - Masks, calculations, default values, required, number of characters, alpha/numeric, hidden, read-only
- Template for commonly used components - user defined as well
- Triggers/actions based on user input
- Routing paths and status
- Audit trails

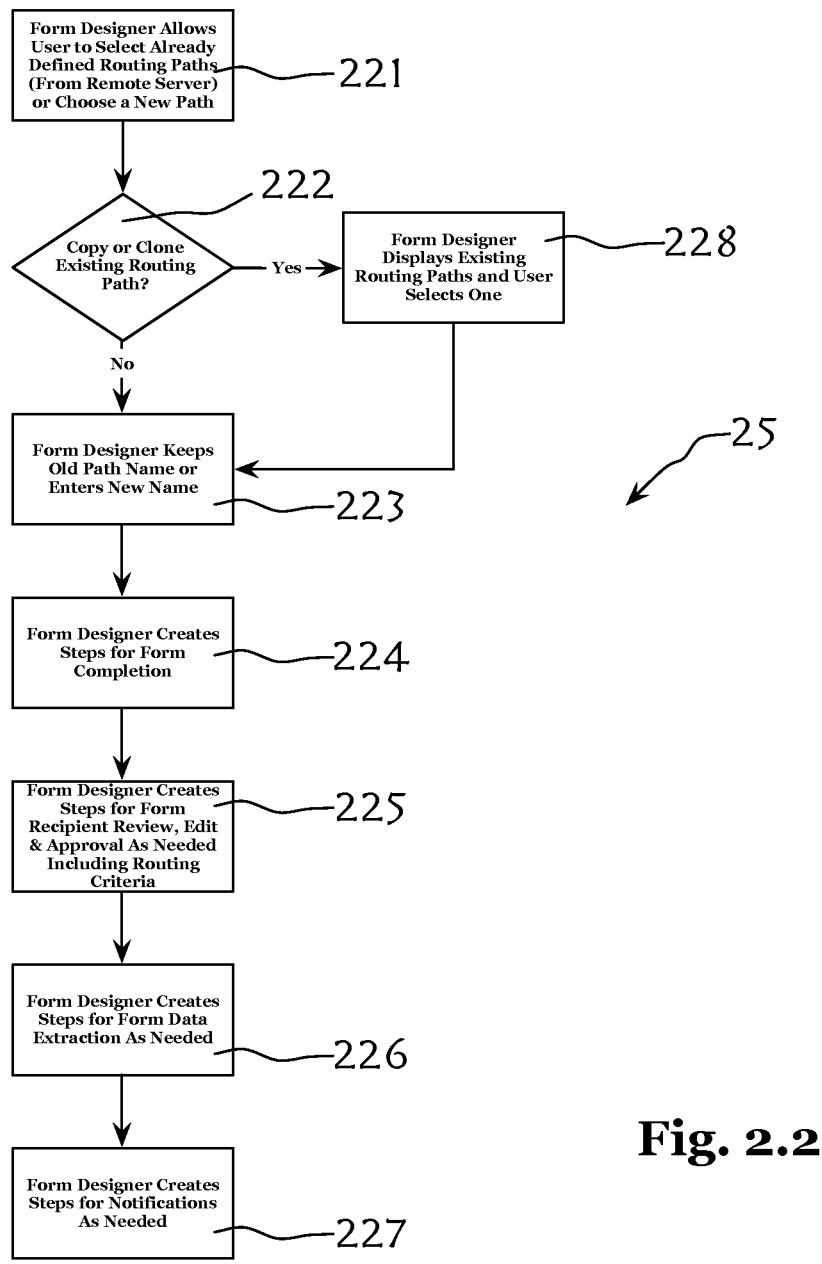
Fig. 2.2

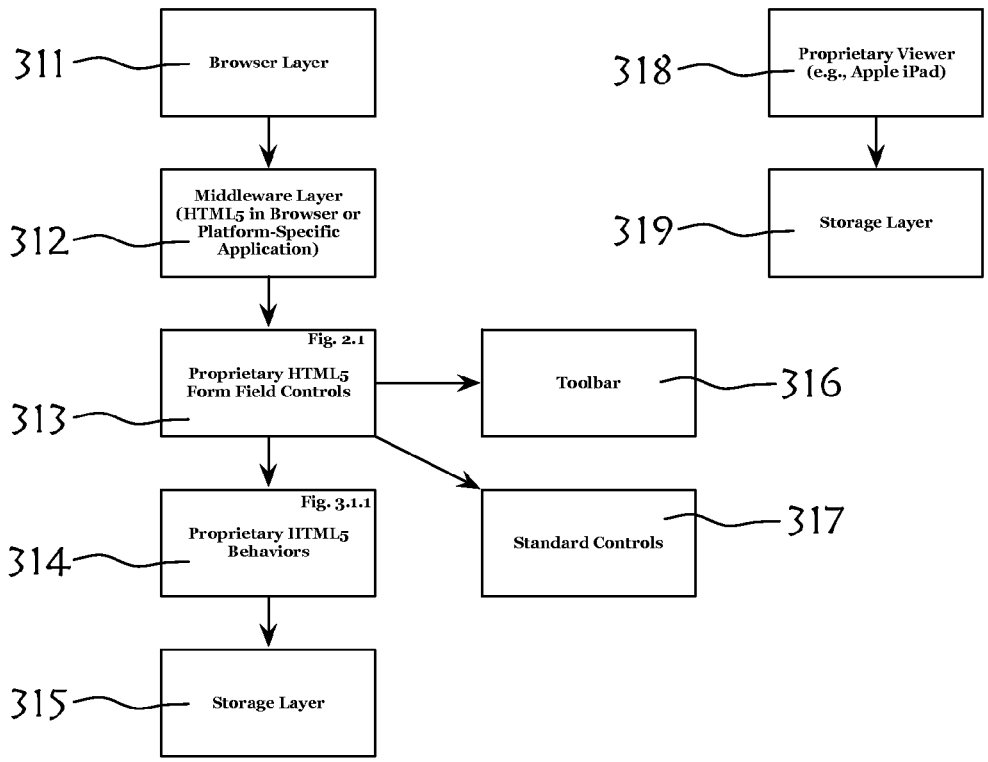
Fig. 3.1

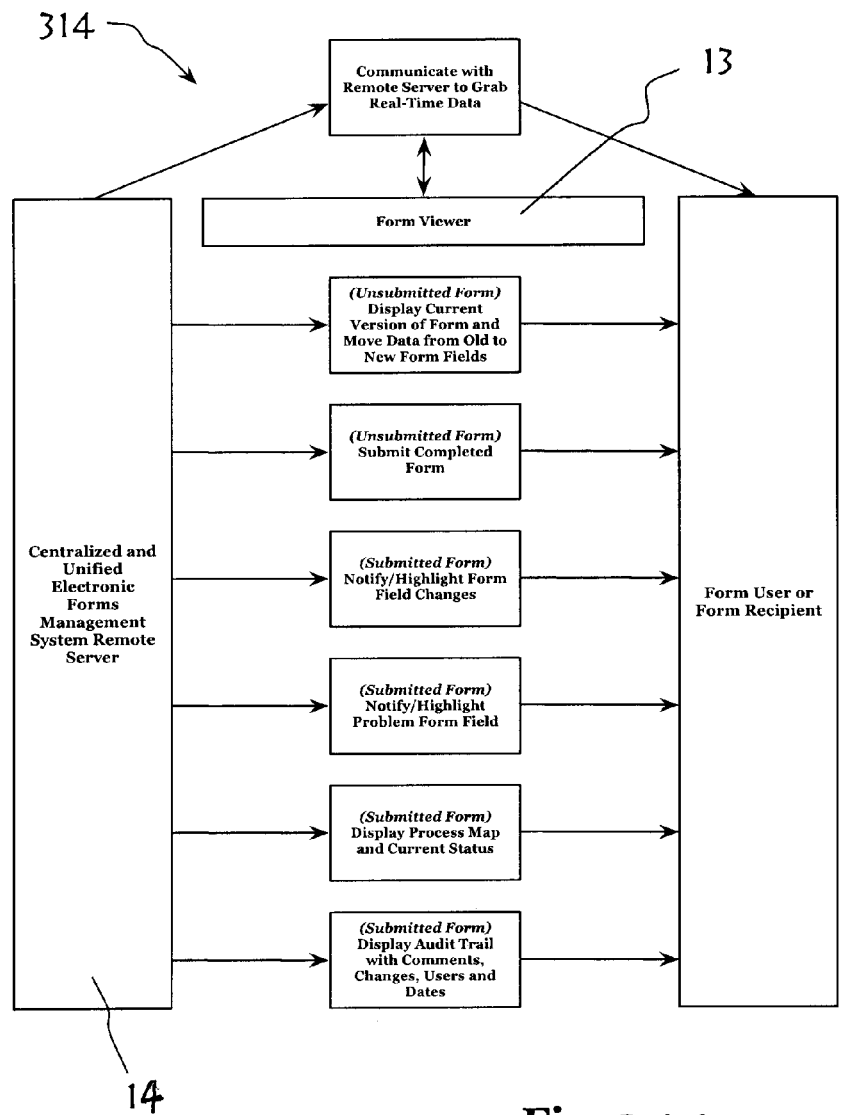
Fig. 3.1.1

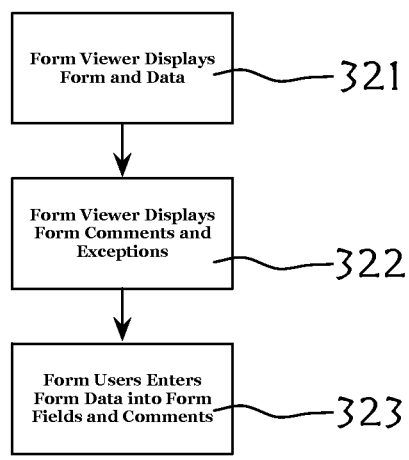
Fig. 3.2

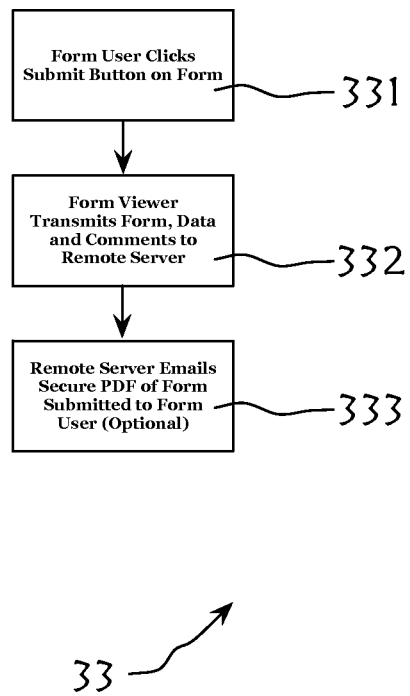
Fig. 3.3

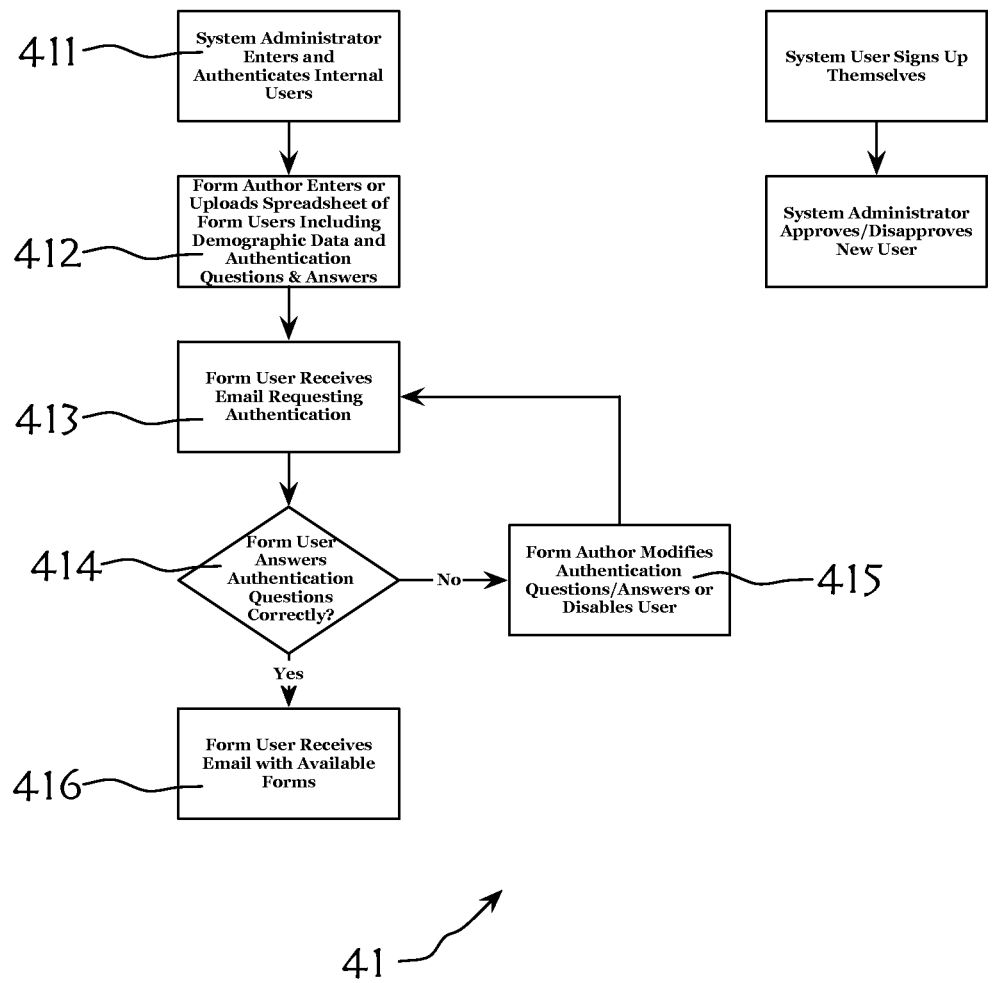
Fig. 4.1

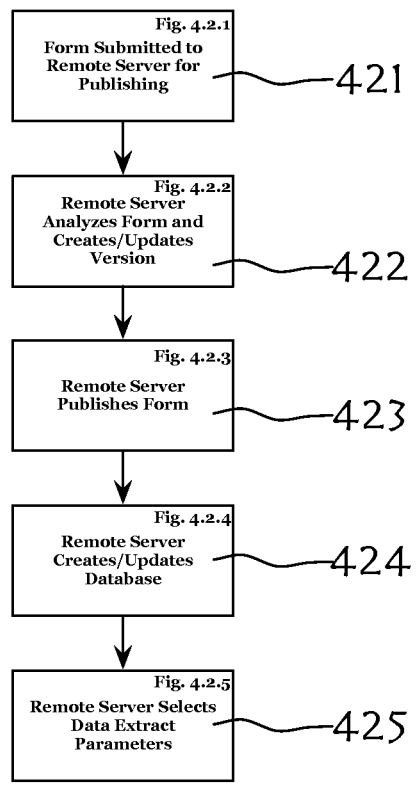
Fig. 4.2

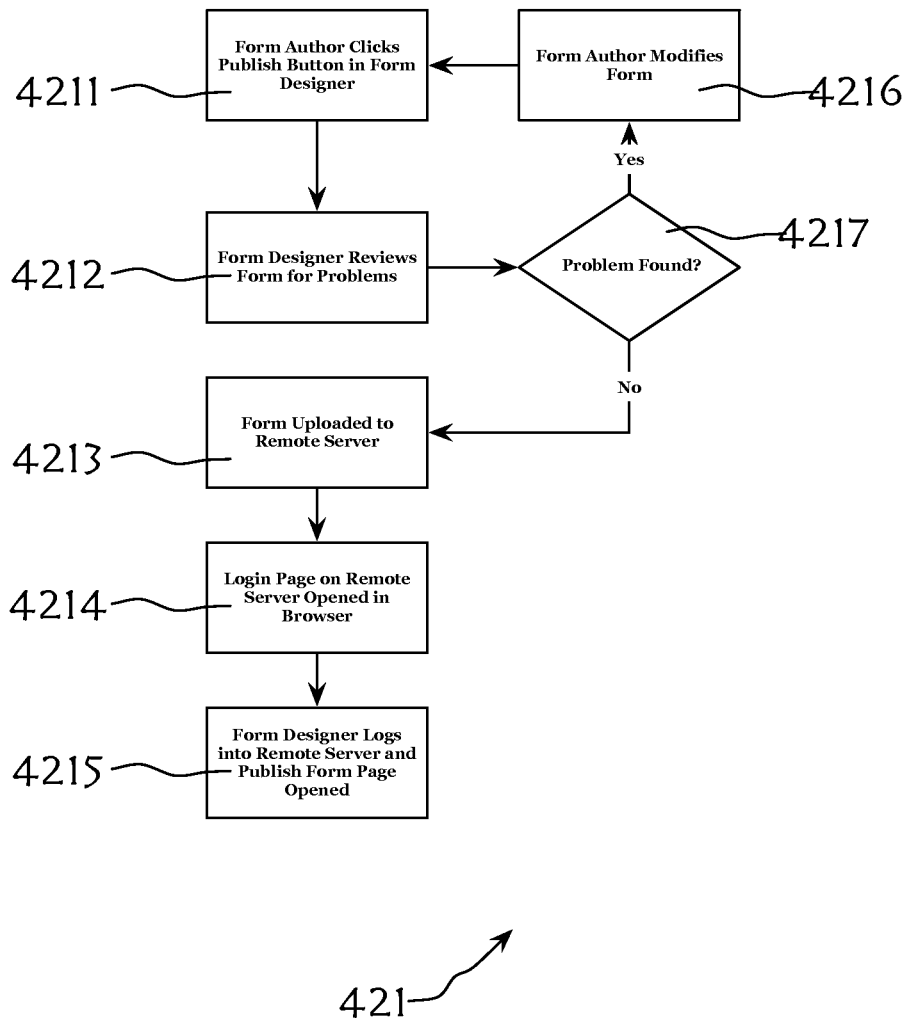
Fig. 4.2.1

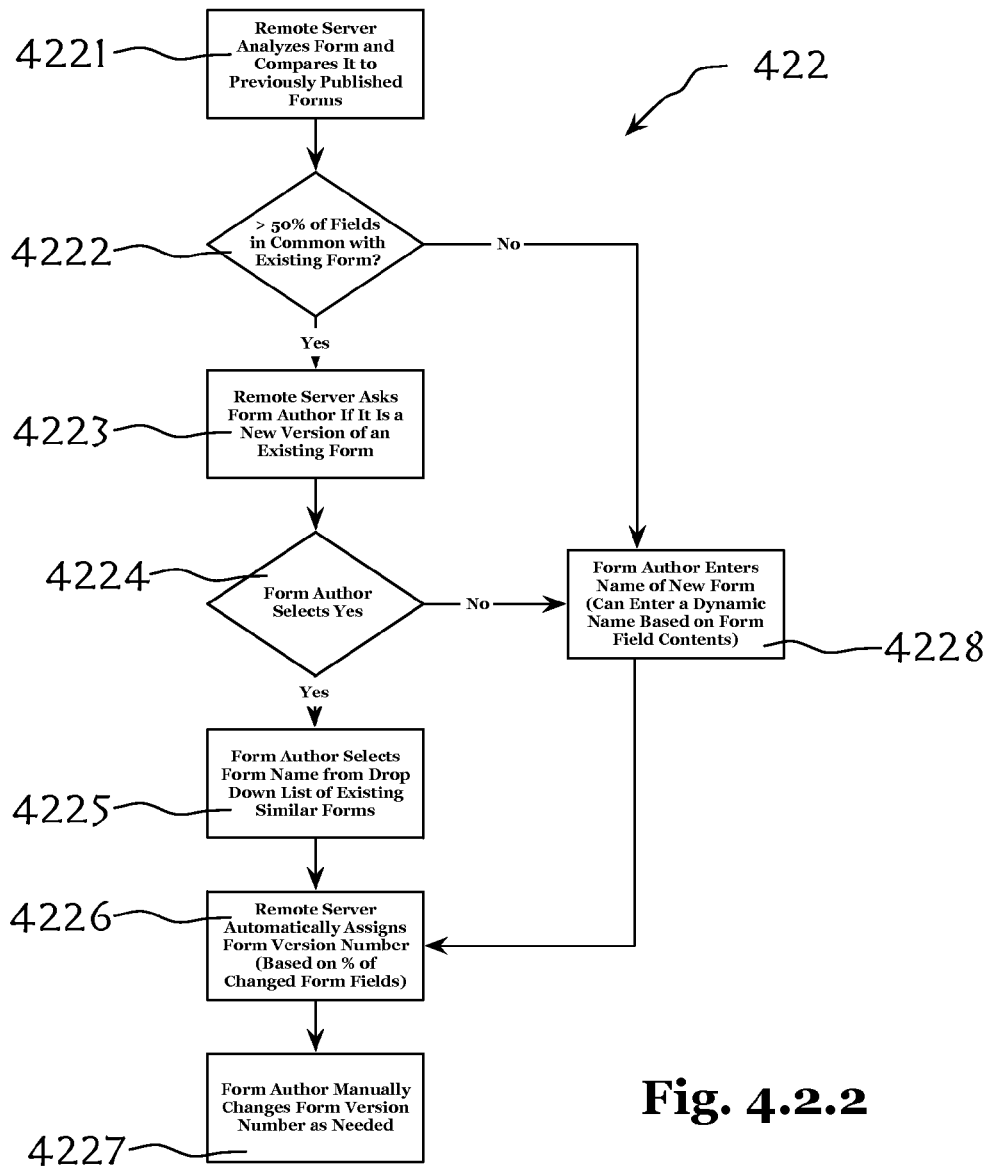
Fig. 4.2.2

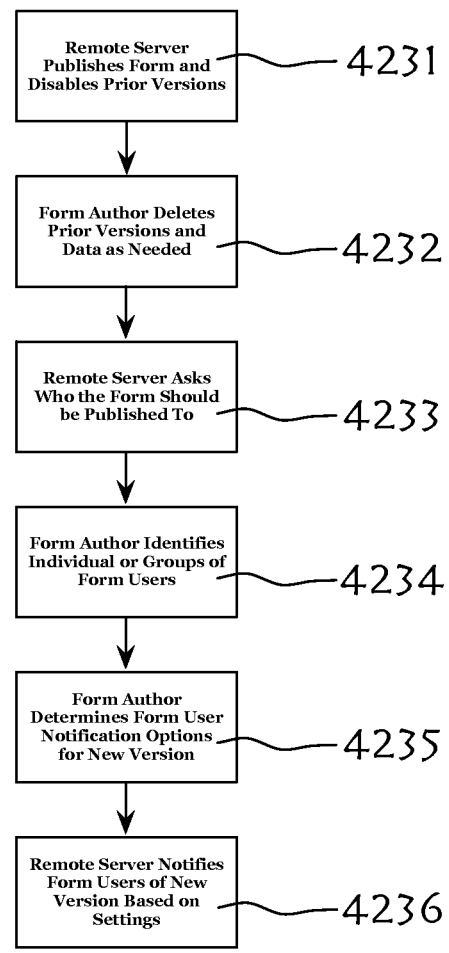
Fig. 4.2.3

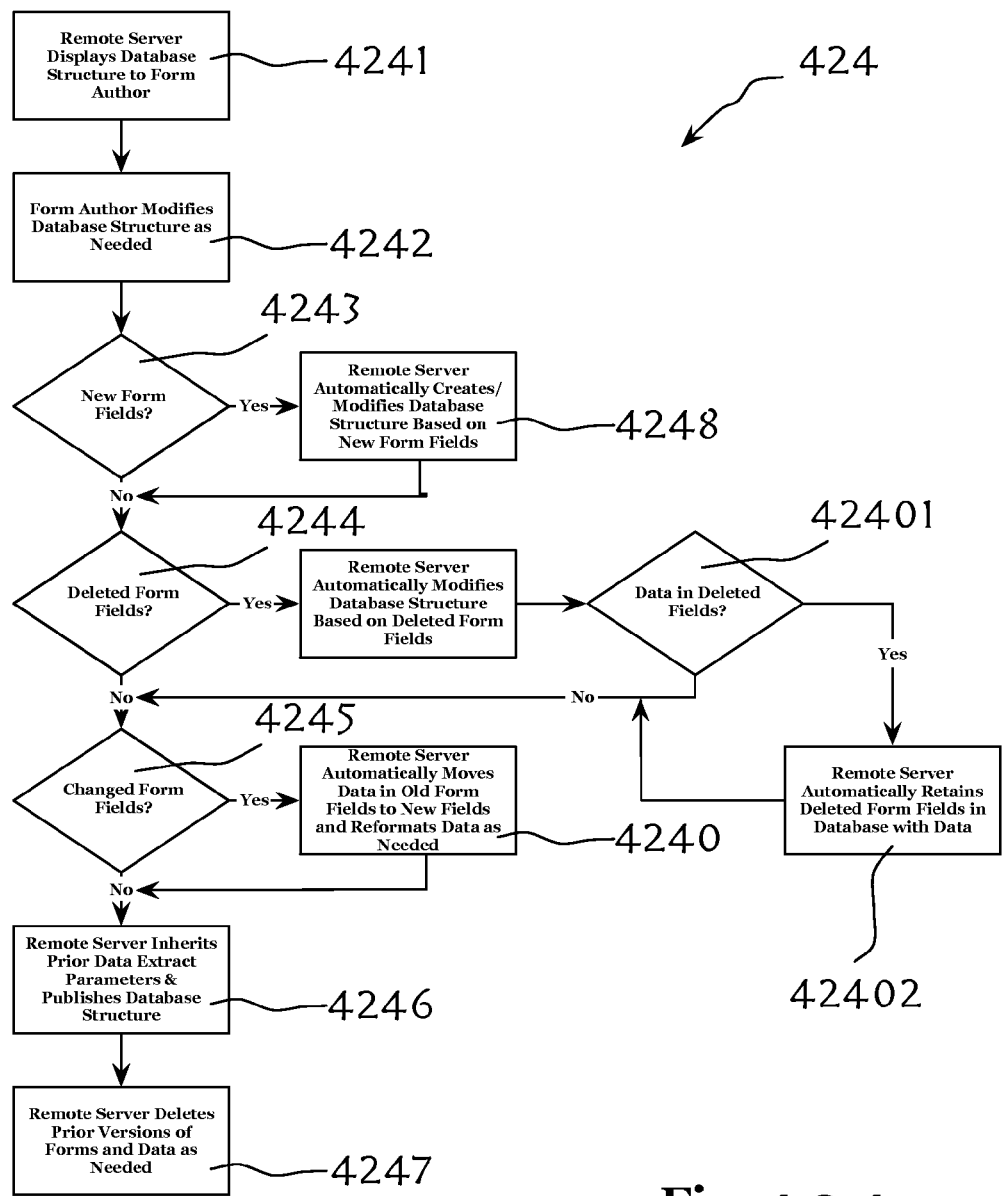
Fig. 4.2.4

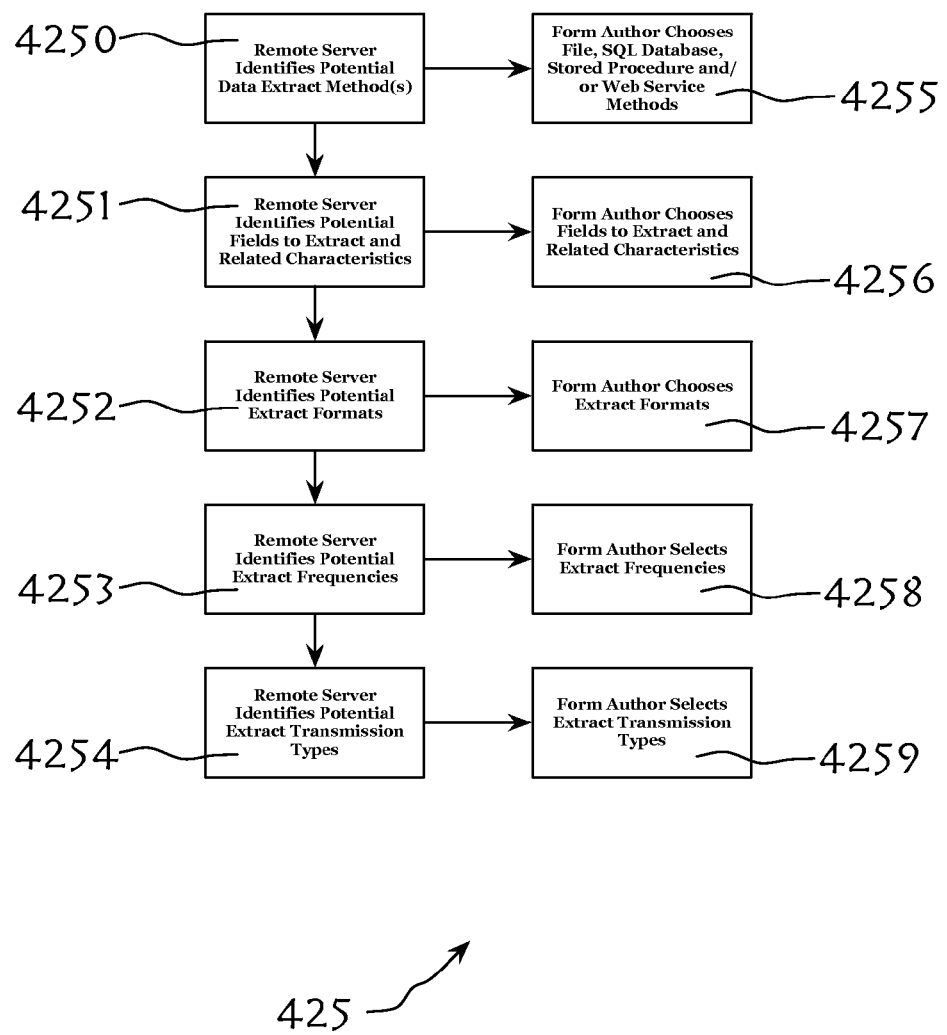
Fig. 4.2.5

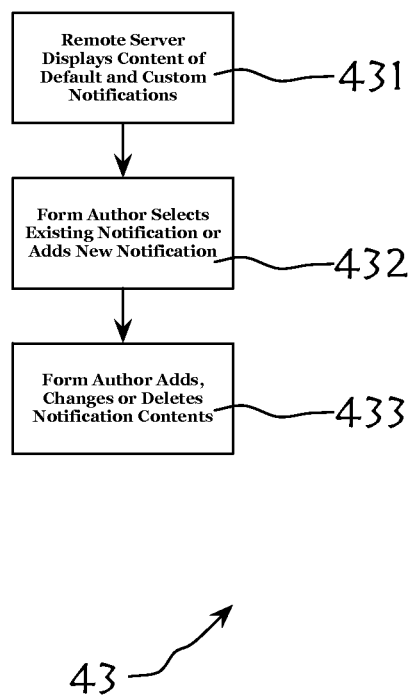
Fig. 4.3

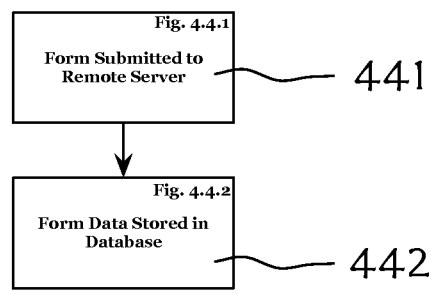
Fig. 4.4

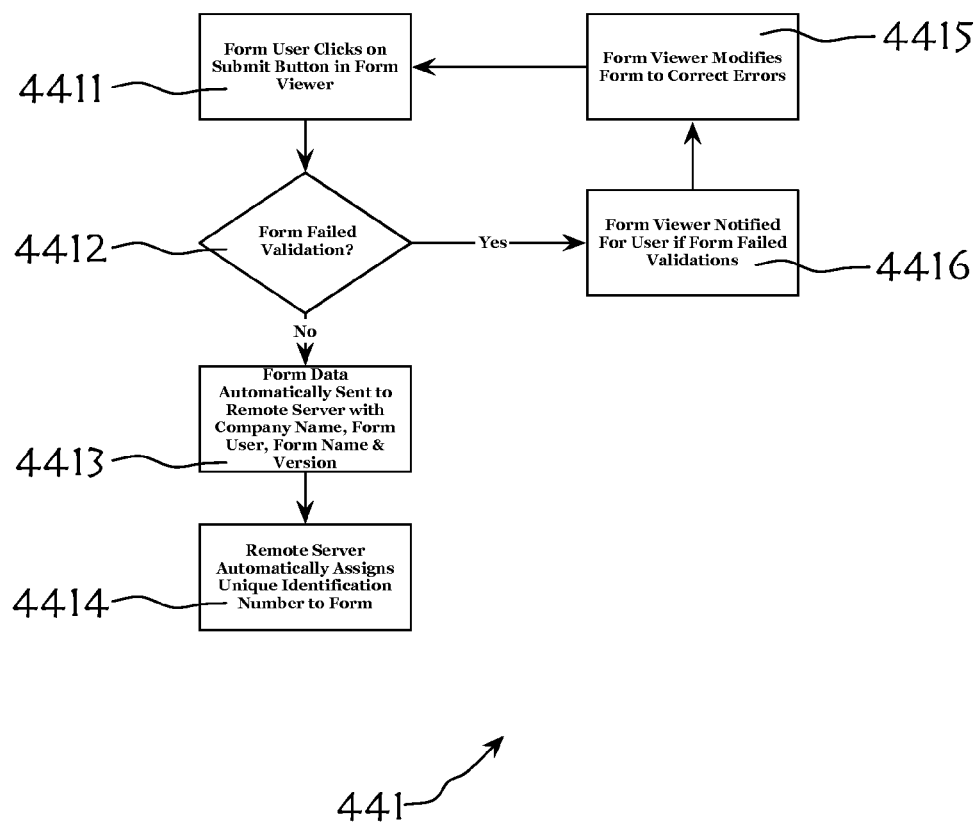
Fig. 4.4.1

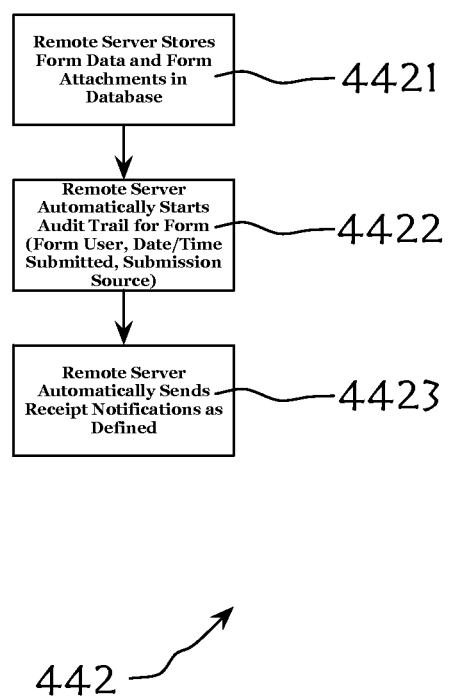
Fig. 4.4.2

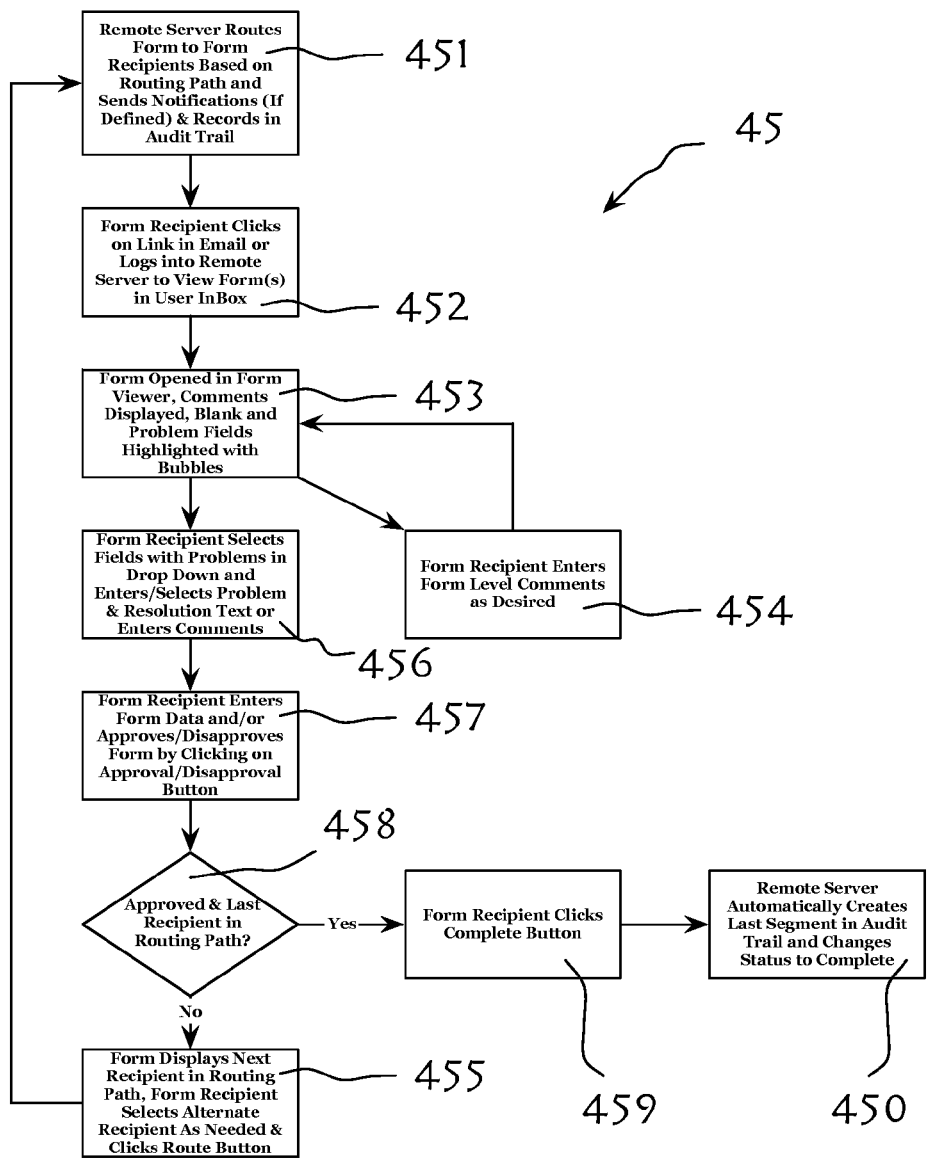
Fig. 4.5

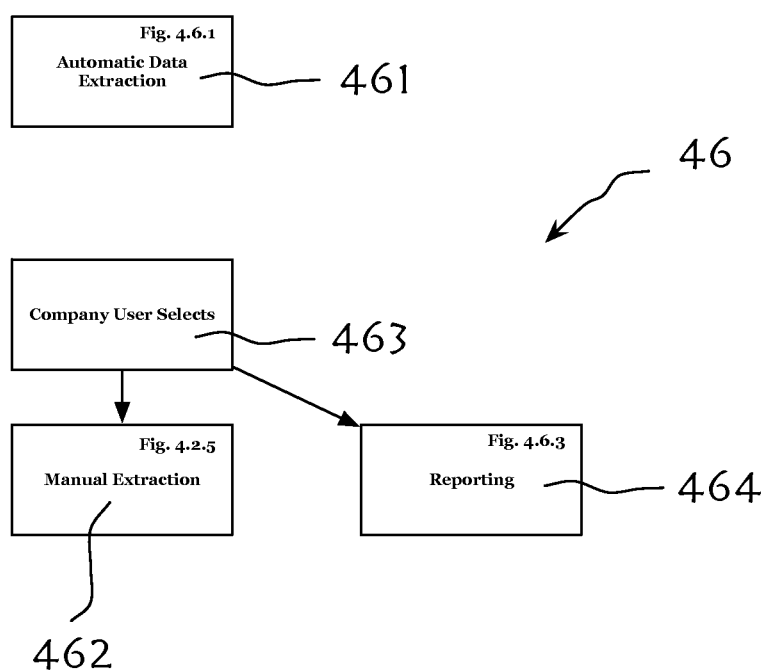
Fig. 4.6

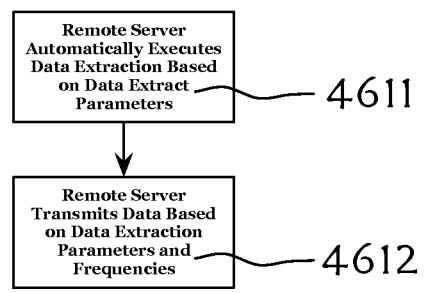
Fig. 4.6.1

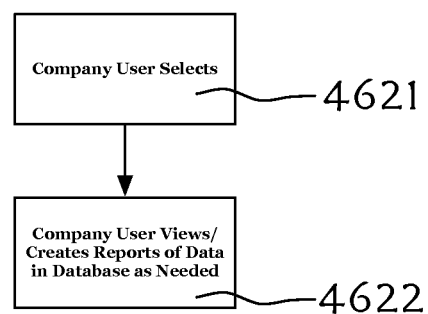
Fig. 4.6.2

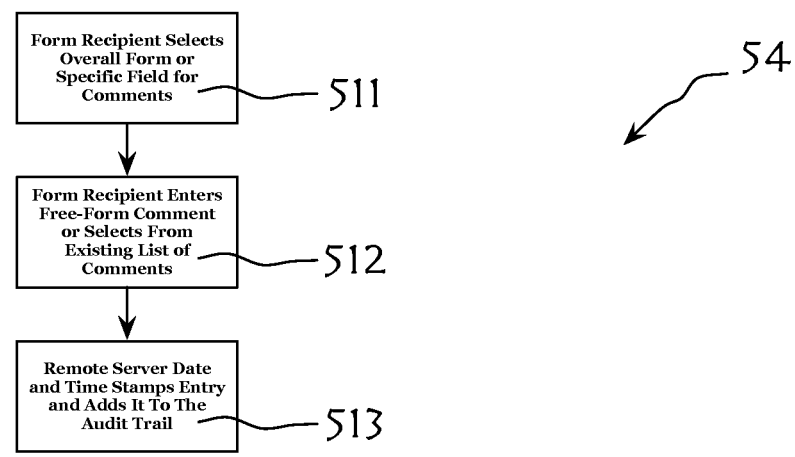
Fig. 5.1

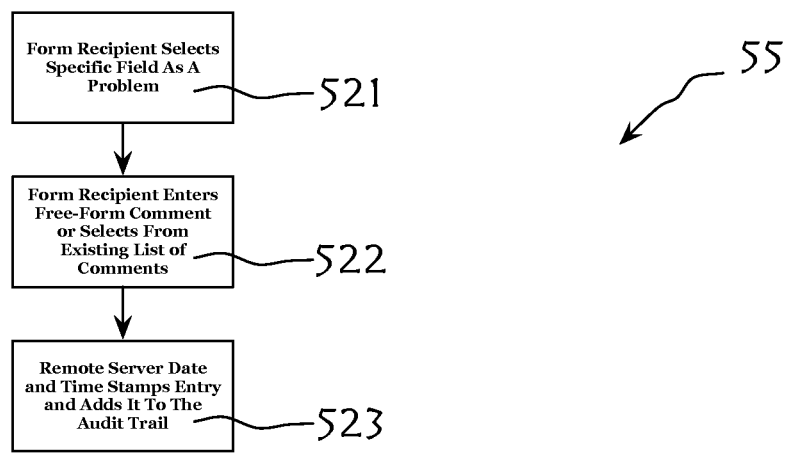
Fig. 5.2

UNIFIED ELECTRONIC FORMS MANAGEMENT SYSTEM

CROSS REFERENCE TO RELATED APPLICATIONS

This application claims the priority of Provisional Patent Application No. 61/311,777, which was filed Mar. 9, 2010. This earlier application and all patent documents and other publications disclosed herein below are fully incorporated by reference, as if fully set forth herein.

BACKGROUND OF THE INVENTION

1. Field of the Invention

The present invention generally relates to electronic forms, in particular a network based application service for creation and management of electronic forms.

2. Description of Related Art

Over 200 billion paper forms are completed in the US alone each year. Even though there are tremendous advantages to using electronic instead of paper forms, a very small percentage of forms are electronic today because it is been time consuming, difficult and expensive to create and publish an electronic form that can be completed by form users electronically and transmit the data into a database or other application. This invention allows for the rapid and cost-effective design, development, and deployment of the electronic version of paper forms, the recording of data on those forms into a database, electronic routing of the forms for approval or problem resolution, transmission of the data into an external system, and reporting of the data gathered.

Paper forms are ubiquitous and are used by government entities, corporations and individuals to gather information. Paper forms have multiple problems that limit their effectiveness and efficiency. First, the form has to be delivered to the form user; sometimes the form can be delivered over the internet but often it is mailed which is time consuming and expensive. Second, even if a form is well designed, form users often forget to complete required form fields or enter information into form fields that is not valid, such as an invalid zip code. In this case the form may be sent back and forth multiple times or require a phone call with the form user until it is complete. Third, it is difficult to eliminate previous versions of forms in circulation which often means firm users complete an old version of a form which does not contain all of the necessary form fields and data; this requires the current version of the form sent back to the form user, restarting, delaying and increasing the cost of the entire process. Fourth, the completed form has to be sent back to the organization that authored the form; this either requires additional mailing time and expense or requires the form user to have a scanner and know how to scan and email the completed form. Fifth, even though the form user just entered it into the paper form, often that same information needs to be reentered into a database or other application by the form author as part of a larger business process. Sixth, it is difficult to know if the person(s) that signed a form are the actual person(s) claimed. Lastly, it is difficult for the form author to know, amongst all form users that have received the forms, who has or has not completed the forms and whether they have been successfully submitted and completed.

Various techniques have been employed to try to solve these problems. Many form authors have created forms that are displayed in a web browser to gather information. While this approach can solve some of the problems mentioned above, the web pages need to be developed by a code programmer with the requisite skills which is time consuming and expensive. Much of the functionality required to make the experience simple for the form user requires very difficult code level programming, adding to the effort, cost and timeline. Forms on web pages also do not have the look and feel of paper forms which makes them difficult for form users to complete properly. Additionally, an entire infrastructure needs to be built to accomplish the delivery, approval routing and management of the forms.

Alternatively, one or more companies such as Adobe Systems, Inc. have developed packaged software that allows for the creation of electronic forms with the look and feel of paper forms. However, the approach utilized by these companies is a decentralized model that assumes form users receive forms anonymously in an email or download them from a website. This precludes the ability of the software to authenticate users in advance of form submittal, requiring them to authenticate themselves each time a form is submitted. Authentication is generally either from a digital certificate which is impractical, difficult and time consuming for individuals to obtain and often does not guarantee authenticity (which is why it is rarely used) or by requiring the form user to print, sign, and mail the form back, defeating the purpose of an electronic version of the form. These systems also do not ensure that the latest version of the form is utilized, which can greatly increase the effort for both form users as well as the organization that receives the completed forms if an prior version of the form is submitted; often the process needs to start all over again since a current version of the form has to be sent to the form user after they have already completed and submitted the previous version. Additionally, this software does not allow for forms to be electronically routed back to form users to correct missing or erroneous information while clearly identifying the missing or erroneous information or to track form status under such a scenario to understand and manage the receipt of all outstanding forms. Lastly, these systems also require advanced code programming skills not available to most form authors to accomplish critical tasks such as form data validation, and is time consuming and expensive to create forms. It is therefore only practical for the largest companies and government agencies that receive thousands of the same forms repeatedly.

Because web forms and this packaged software have not solved these critical problems, most forms today are still paper-based as they are faster and easier to develop and deploy with far less effort. Even though data on the forms has to be reentered into a database or other back-end system, it is still less effort than utilizing any of the software descried above.

There remains a need to provide a network based application to facilitate users to manage form data and creation, storage, update and distribution of electronic forms.

SUMMARY OF THE INVENTION

The present invention is directed to a unified electronic forms management system that comprises a network-based software implemented process that is designed to provide its users with access to a unified system and process of managing form data and the creation, storage, update and distribution of electronic forms. In one aspect, the unified forms management system of the present invention may comprise a unified electronic forms management system remote server in network communication with a remote form designer used by a user to create a form, a remote form viewer used by the form user, form recipient(s) which optionally receive the form for approval and/or to provide additional information, a database that stores the form data associated with the remote server, and external database(s) which optionally receive data transmitted by the unified system. The unified system allows anyone, including non-code programmers, to author (create) an electronic form with the look and feel of a paper form, design and deploy a database of form fields to store the data, design approval and problem resolution steps to allow the form to be routed electronically to complete the business process, specify data file format, field transformations, and file transmission methods to allow the software to create and send an electronic file containing the form data into an external system and publish the form so it can be used. The system allows the form author to authenticate form users once for all forms, send forms to form users electronically, automatically update the form for form users to the current version whenever it is opened, allow form users to complete the form online or offline including an electronic signature, submit the form electronically, electronically route the form to form recipients for approval and problem resolution including highlighting specific problems with the form, and store the form including its data in a database on the remote server.

In another aspect of the present invention, the system functions may be centralized, with the complementary user related functions in network communication with the unified system (e.g., form viewer and designer).

As used throughout herein, "unified" refers to user perspective of unification of functions (e.g., most of the back-office form management functions) in a system, which system provides forms to a form user and process them anytime, anywhere, anyhow with a common look and feel (the electronic version of WYSIWYG paper forms) adapted to the device used and to its available capabilities; and "centralized" refers to the management of more critical activities and/or components at a centrally managed device or a group of devices in a single location or a cluster of distributed locations that are logically linked (collectively, a "remote server").

In one embodiment shown, the unified electronic forms management system may comprise a centralized and unified electronic forms management system remote server, which communicates over a network with a remote form designer used by a user to create a form, a remote form viewer used by a form user, a database that stores the form data associated with the remote server, and external database(s) that optionally receive data transmitted by the unified system. Form recipient(s) have the option of receiving over the network the form for approval and/or to provide additional information.

BRIEF DESCRIPTION OF THE DRAWINGS

For a fuller understanding of the scope and nature of the invention, reference should be made to the following detailed description read in conjunction with the accompanying drawings that depict system modules, functionality and processes.

FIG. 2.1 is a list of both standard and proprietary HTML5 form field controls utilized by the system, in accordance with one embodiment of the present invention.

FIG. 2.2 is a diagram depicting the steps required for the system to define a routing path for a form, in accordance with one embodiment of the present invention.

FIG. 3.1 is a diagram depicting the key components to the form viewer, in accordance with one embodiment of the present invention.

FIG. 3.1.1 is a diagram depicting how the form viewer interacts with the remote server to display a form, including exemplary proprietary HTML5 behaviors, in accordance with one embodiment of the present invention.

FIG. 3.2 is a diagram depicting how a form user displays a form and enters information into the form, in accordance with one embodiment of the present invention.

FIG. 3.3 is a diagram depicting the steps required by a form user to submit a completed form to the remote server, in accordance with one embodiment of the present invention.

FIG. 4.1 is a diagram depicting how the system establishes and authenticates new system users including form users and form authors, in accordance with one embodiment of the present invention.

FIG. 4.2 is a diagram depicting the steps required for form authors to design and publish a form, in accordance with one embodiment of the present invention.

FIG. 4.2.1 is a diagram depicting the steps required for form authors to publish a form, in accordance with one embodiment of the present invention.

FIG. 4.2.2 is a diagram depicting how the remote server analyzes and publishes a form including determining the correct version of the form, in accordance with one embodiment of the present invention.

FIG. 4.2.3 is a diagram depicting how the remote server manages prior versions of the form including data already stored in the database and notifies form users of the updated form, in accordance with one embodiment of the present invention.

FIG. 4.2.4 is a diagram depicting how the remote server updates the database for the form including managing prior version form data, in accordance with one embodiment of the present invention.

FIG. 4.2.5 is a diagram depicting how a form author defines all of the parameters required for the remote server to automatically extract data from the database and transmit it to an external system, in accordance with one embodiment of the present invention.

FIG. 4.3 is a diagram depicting how a form author defines notifications for a given form, in accordance with one embodiment of the present invention.

FIG. 4.4 is a diagram depicting how a form user submits a completed form to the remote server, in accordance with one embodiment of the present invention.

FIG. 4.4.1 is a diagram depicting the steps required by a form user to submit a completed form and steps taken by the remote server when it receives the form data, in accordance with one embodiment of the present invention.

FIG. 4.4.2 is a diagram depicting how the remote server stores form data and initiates the audit trail for the form, in accordance with one embodiment of the present invention.

FIG. 4.5 is a diagram depicting how the remote server routes a form utilizing the routing path defined including form approvals, in accordance with one embodiment of the present invention.

FIG. 4.6 is a diagram depicting how the remote server allows a form user to extract form data from the database either automatically or manually, in accordance with one embodiment of the present invention.

FIG. 4.6.1 is a diagram depicting how the remote server automatically extracts data from the database according to the data extract parameters defined by the form author, in accordance with one embodiment of the present invention.

FIG. 4.6.2 is a diagram depicting the steps required by a form author to utilize the remote server to generate reports containing form data, in accordance with one embodiment of the present invention.

FIG. 5.1 is a diagram depicting how a form recipient enters comments into the overall form or a specific field on the form, in accordance with one embodiment of the present invention.

FIG. 5.2 is a diagram depicting how a form recipient identifies problems with form contents, in accordance with one embodiment of the present invention.

DETAILED DESCRIPTION OF EMBODIMENTS OF THE INVENTION

Figure 1:
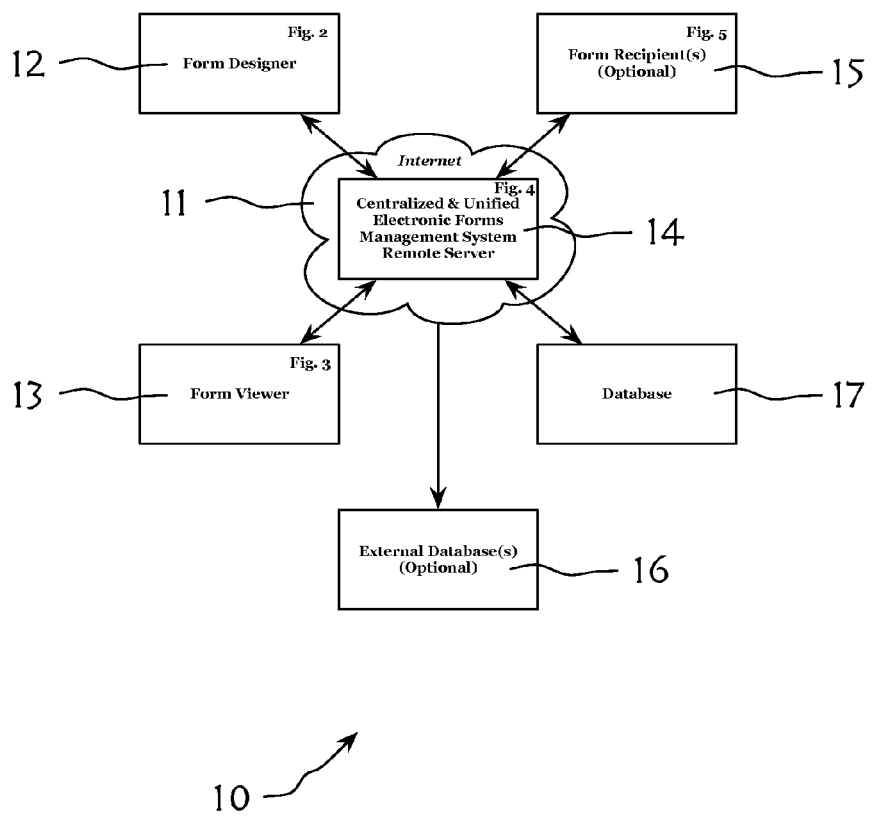
FIG. 1 is a high level system diagram depicting the centralized, unified forms management system, in accordance with one embodiment of the present invention.

The present description is of the best presently contemplated mode of carrying out the invention. This description is made for the purpose of illustrating the general principles of the invention and should not be taken in a limiting sense. The scope of the invention is best determined by reference to the appended claims.

The detailed descriptions of the system and process of the present invention are presented in terms of schematics, functional components, methods or processes, symbolic or schematic representations of operations, functionalities and features of the invention. These descriptions and representations are the means used by those skilled in the art to most effectively convey the substance of their work to others skilled in the art. A software implemented function, method or process is here, and generally, conceived to be a self-consistent sequence of steps leading to a desired result. These steps require physical manipulations of physical quantities. Often, but not necessarily, these quantities take the form of electrical or magnetic signals capable of being stored, transferred, combined, compared, and otherwise manipulated by associated hardware, software and firmware.

Useful devices for performing the software implemented processes, operations and functions of the present invention include, but are not limited to, general or specific purpose digital processing and/or computing devices, which devices may be standalone devices or part of a larger system, portable, handheld or fixed in location. Different types of client and server devices can be configured to implement the electronic form applications of the present invention. For example, the various electronic forms management applications of the present invention may be accessed using different types of client computing devices. The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like. For example, portable computing devices may include notebook computers, netbook computers, tablet devices, etc., and hand-held devices may include smart phones, PDAs (personal digital assistants), etc.

These devices may be selectively activated or configured by a program, routine and/or a sequence of instructions and/or logic stored in the devices to execute the disclosed functions, processes and operations. In short, use of the processes, functions and operations described and suggested herein is not limited to a particular processing configuration.

For purposes of illustrating the principles of the present invention and not by limitation, the present invention is described herein below by reference to an exemplary system. However, it is understood that the present invention is equally applicable to systems of other configurations embodying the invention, without departing from the scope and spirit of the present invention.

System Overview

The unified electronic forms management system comprises a network-based software implemented process that is designed to provide its users with access to a unified system and process of managing form data and the creation, storage, update and distribution of electronic forms. In one aspect, the unified forms management system may comprise a unified electronic forms management system remote server in network communication with a remote form designer used by a user to create a form, a remote form viewer used by the form user, form recipient(s) which optionally receive the form for approval and/or to provide additional information, a database that stores the form data associated with the remote server, and external database(s) which optionally receive data transmitted by the unified system. The unified system allows anyone, including non-code programmers, to author (create) an electronic form with the look and feel of a paper form, design and deploy a database of form fields to store the data, design approval and problem resolution steps to allow the form to be routed electronically to complete the business process, specify data file format, field transformations, and file transmission methods to allow the software to create and send an electronic file containing the form data into an external system and publish the form so it can be used. The system allows the form author to authenticate form users once for all forms, send forms to form users electronically, automatically update the form for form users to the current version whenever it is opened, allow form users to complete the form online or offline including an electronic signature, submit the form electronically, electronically route the form to form recipients for approval and problem resolution including highlighting problems with the form, and store the form including its data in a database on the remote server.

In another aspect of the present invention, the system functions may be centralized, with the complementary user related functions in network communication with the unified system (e.g., form viewer and designer).

In the illustrated embodiment shown in FIG. 1, the Unified Electronic Forms Management System 10 may comprise a centralized and unified electronic forms management system remote server 14, which communicates over the network 11 (e.g., Internet) with a remote form designer 12 used by a user to create a form, a remote form viewer 13 (used by the form user), a database 17 that stores the form data associated with the remote server 14, and external database(s) 16 that optionally receive data transmitted by the unified system. Form recipient(s) 15 have the option of receiving over the network 11 the form for approval and/or to provide additional information.

Computing Environment Including Information Exchange Network

The unified network-based electronic forms management platform in accordance with the present invention may involve, without limitation, distributed information exchange networks, such as public and private computer networks (e.g., Internet, Intranet, WAN, LAN, etc.), value-added networks, communications networks (e.g., wired or wireless networks), broadcast networks, and a homogeneous or heterogeneous combination of such networks. As will be appreciated by those skilled in the art, the networks include both hardware and software and can be viewed as either, or both, according to which description is most helpful for a particular purpose. For example, the network can be described as a set of hardware nodes that can be interconnected by a communications facility, or alternatively, as the communications facility, or alternatively, as the communications facility itself with or without the nodes. It will be further appreciated that the line between hardware and software is not always sharp, it being understood by those skilled in the art that such networks and communications facility involve both software and hardware aspects.

The Internet is an example of an information exchange network including a computer network in which the present invention may be implemented. Many servers are connected to many clients (which may be desktop, portable and/or handheld devices) via the Internet network, which comprises a large number of connected information networks that act as a coordinated whole. Details of various hardware and software components comprising the Internet network (such as servers, routers, gateways, etc.) are well known in the art. Access to the Internet by the servers and clients may be via suitable transmission media, such as ethernet, satellite, telephone wires, wireless RF links, Wifi, Bluetooth, or the like, and user interface tools, such as browsers, implemented therein. Communication between the servers and the clients takes place by means of an established protocol. As will be noted below, the unified forms management system of the present invention may be configured in or as one or more of the servers, which is accessible by a user via one or more of the clients.

Figure 9:
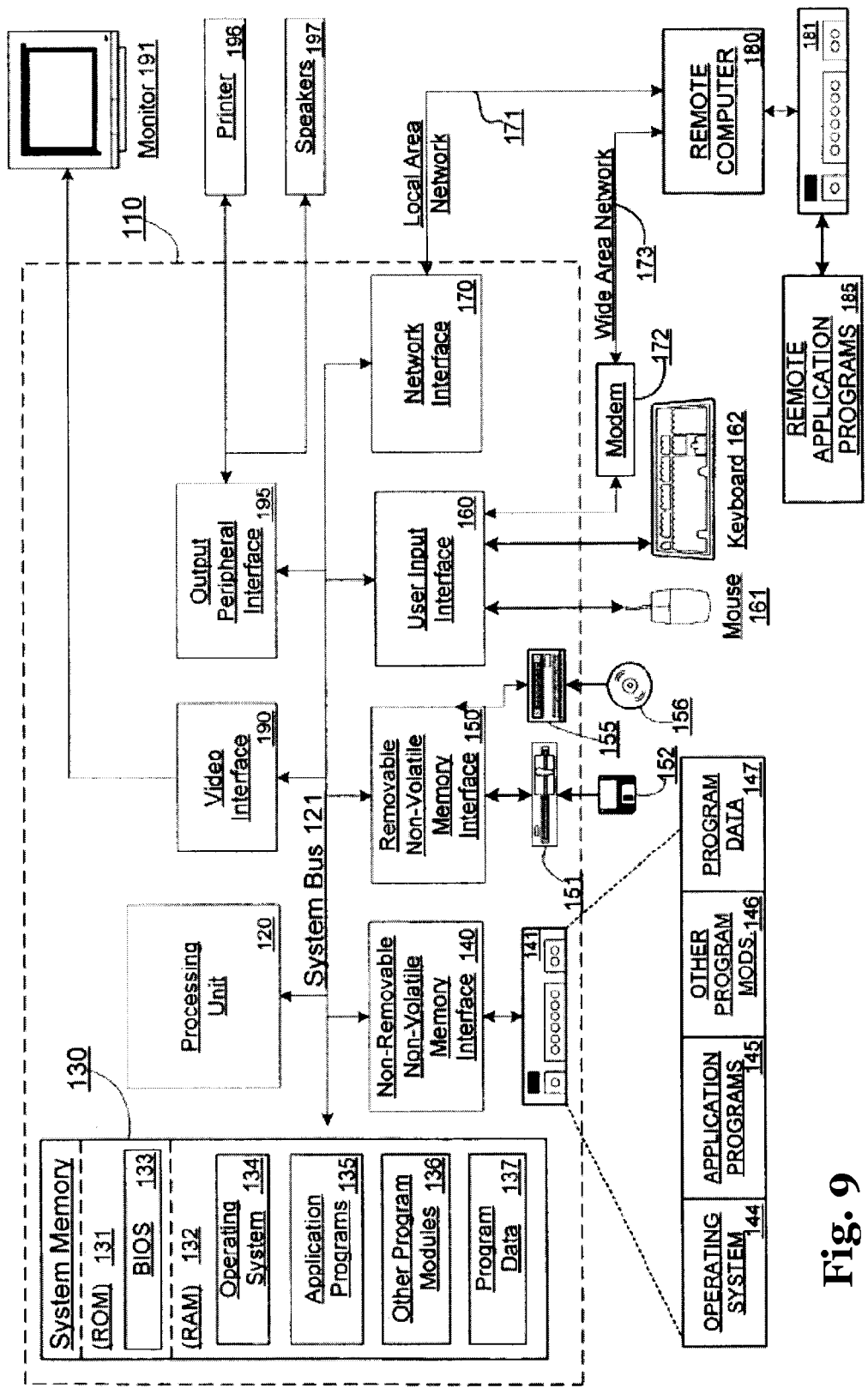
FIG. 9 is a schematic diagram of an exemplary computing environment in which aspects of the invention may be implemented, in accordance with one embodiment of the present invention.

FIG. 9 shows an exemplary computing environment 100 in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types, including the networked based (e.g., web-based) application of the system and process described herein below. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 9, an exemplary system for implementing the invention includes a general purpose computing device in the form of a computer 110 (which is exemplary of the components adopted by servers and/or clients). Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. Communication media typically embodies computer readable instructions, data structures, program modules or other data in a modulated data signal (i.e., a signal that has one or more of its characteristics set or changed in such a manner as to encode information in the signal) such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 9 illustrates operating system 134, application programs 135, other program modules 136, and program data 137.

The computer 110 may also include other removable/non-removable, volatile/nonvolatile computer storage media. By way of example only, FIG. 9 illustrates a hard disk drive 141, a magnetic disk drive 151 that reads/writes a removable magnetic disk 152, and an optical disk drive 155 that reads/writes a removable optical disk 156, such as a CD ROM or other optical media. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 9, provide storage of computer readable instructions, data structures, program modules and other data for the computer 110. In FIG. 9, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 9. The logical connections depicted in FIG. 9 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules accessible by the computer 110, or portions thereof, may be stored in the remote memory storage device 181. By way of example, and not limitation, FIG. 9 illustrates remote application programs 185 as residing on memory storage device 181 associated with the remote computer 180. It will be appreciated that the network connections shown are exemplary and other means of establishing a communications link between the computers may be used.

In the below disclosed embodiment of the present invention, the unified electronic forms management system of the present invention may be implemented in a the network-based application represented by the remote application programs 185 residing in the memory storage device 181, which is accessed by the computer 110 and executed via the remote computer 180, within the environment shown in FIG. 9. In other words, the remote computer 180 undertakes the functions of a server, and the computer 110 undertakes the role of a client, in reference to the network environment shown in FIG. 9.

This invention works in conjunction with existing technologies, which are not detailed here, as they are well known in the art and to avoid obscuring the present invention. Specifically, methods currently exist involving the Internet, web based tools and communication, and related methods and protocols.

Remote Server

Figure 4:
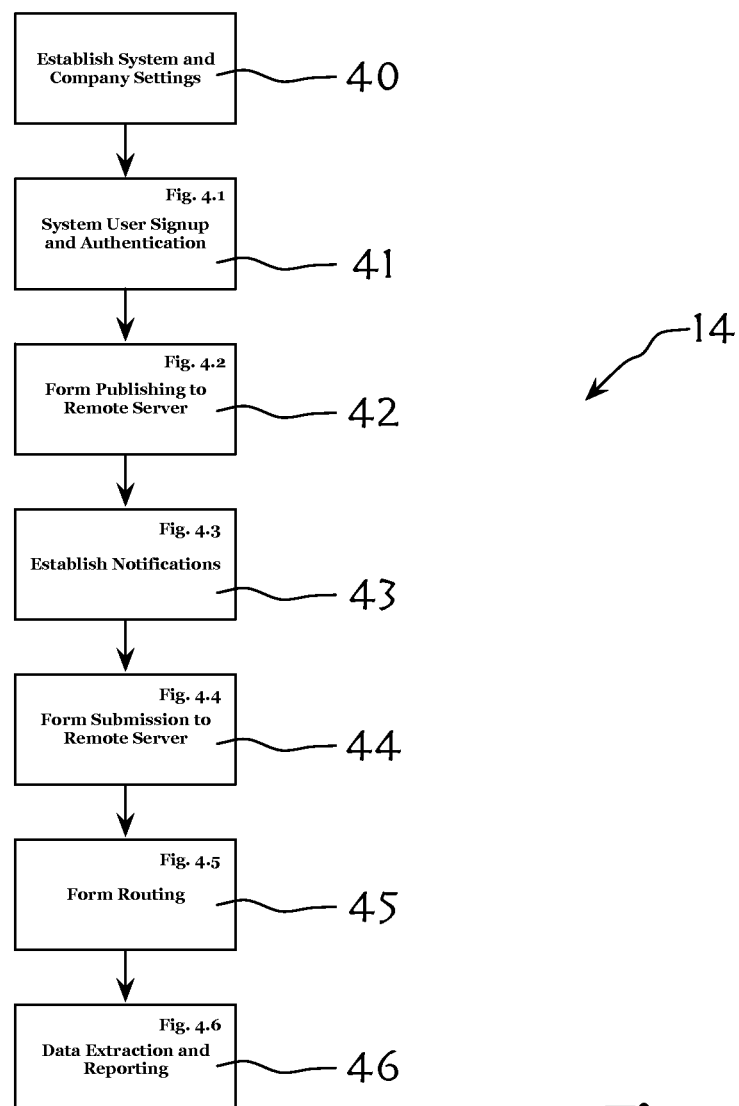
FIG. 4 is a diagram depicting the key steps required for an entity to setup the remote server, author and publish a form to the remote server including routing paths, receive completed forms into the remote server including storing form data into the database, route the forms according to the routing path defined, extract form data from the database into a back-end system, and generate reports of data gathered, in accordance with one embodiment of the present invention.

The "center" of the Unified Electronic Forms Management System 10 is the remote server 14, which manages the entire system 10. FIG. 4 schematically illustrates the functional blocks comprising the remote server 14. Each functional block will be separately discussed below in reference to sub-level figures.

At block 40, each user organization using the system establishes their organization-specific information on the remote server 14 including information such as, but not limited to, their organization name and physical address, company logo (through an upload of a graphic file), and email address domain name by manually entering data or uploading files containing that information into a series of web pages on the remote server 14.

Heretofore, paper forms are generally distributed in one of three ways: A form user either obtains a form from a distributed group of paper forms (for example, a student takes a form authorizing them to go on a field trip from a pile of forms in the school office), or downloads an electronic copy of it from a website (for example, a form from the government), or is specifically sent the form by an organization (for example, an insurance company mails a form to a form user to submit an insurance claim). The form user typically completes the form, signs it, and sends it back to the appropriate organization. Generally the only means of authentication is a signature on the form, which in reality cannot be validated because the form author in practice never has a validated signature to compare it to and the people that process the forms are not experts in signature verification. The paper forms are generally available to anyone to complete and are therefore anonymous and contain no information to authenticate the form user; the (presumably valid) signature is the authentication.

Heretofore, existing electronic forms systems mirror the authentication method used with paper forms, i.e., a handwritten signature. This is because it is impractical for a person distributing a paper form to put unique information identifying a form user on each copy of the paper form; it is therefore by definition a decentralized and anonymous system. When a form is truly electronic and can be submitted electronically, authentication can be provided from a type of digital signature. However, few people own a digital signature primarily because handwritten signatures suffice and are easy to use and without cost, while the cost and time required to obtain a digital signature is significant and can be confusing to a non-technical person, which in turn has meant that few organizations require it for their forms; this is a self-reinforcing process. In fact, almost all electronic versions of forms require the completed form to be printed and signed with a handwritten signature. Most existing electronic forms systems assume that forms are distributed anonymously and therefore do not attempt to authenticate form users beforehand. In addition, those systems were mostly developed before the penetration of the Internet through society and the advent of user-friendly, sophisticated websites that would allow for ease of authentication.

Since the internet has thoroughly penetrated society and web-based technologies have gained a sufficient level of sophistication, the present invention can take advantage of these technologies to utilize a centralized, identified, one-time authentication approach rather than the decentralized, anonymous, each-time authentication approach utilized by paper and existing electronic forms systems.

FIG. 4.1 schematically illustrates the functional blocks involved in system user signup and initial initialization block 41. Any user of the system 10 who either is a form author or a form user is initially established and authenticated on the remote server 14, either by the system administrator (at 411) or a form author (at 412) by either entering or uploading an excel spreadsheet containing user names, user email addresses, related demographic information and several pieces of information (questions and answers) that only the user would know for authentication purposes. Once user data is entered or uploaded, the remote server 14 automatically sends an email to those users and asks them to authenticate themselves by answering those questions to establish their identity in the system (at 413) on a web page published by the remote server. Central to proper authentication of form users are these authentication questions that a form user is required to complete successfully in order to be authenticated. In the illustrated embodiment, if the form user feels that an answer is invalid (at 414), the form user can challenge the answer by entering specific information into the web page published by the remote server which results in a message sent to the system administrator or form author so they can research and potentially change the answer if it was incorrect (at 415). For example, if one of the authentication questions asks the form user the zip code of their home address but the information the form author had for this form user was incorrect, the form user will not be able to authenticate themselves and will need to inform the form author of the error in their records. The form author can then correct the information in the remote server and reinitiate form user authentication.

Once authenticated by the remote server (at 416), the form user receives an email listing forms available to them or the form user can logon to the remote server at any time to view thumbnails of available forms on the remote server as well as the status of any form they have submitted. In another embodiment, a system that has already authenticated a form user can embed the form viewer on one of their web page and allow a form user to complete and submit a form online. For example, if a user has already logged into their bank's website, they can select, view and complete a form on that same website. The submitted form would be transmitted to the remote server just as any form submitted by the form viewer.

In addition, in another embodiment, any user can setup themselves as a form user by entering their information into a web page on the remote server (at 417); this request is routed electronically by the remote server to a system administrator at the organization to approve the addition of that form user (at 418). In a further embodiment, further options are available to form users. For example, form users are able to specify default settings on the remote server such as reminder email frequency, form submission receipt format and availability, and the default screen shown after logging in to the remote server. Other aspects of the remote server 14 will be described further in the disclosure later below.

Form Designer

Figure 2:
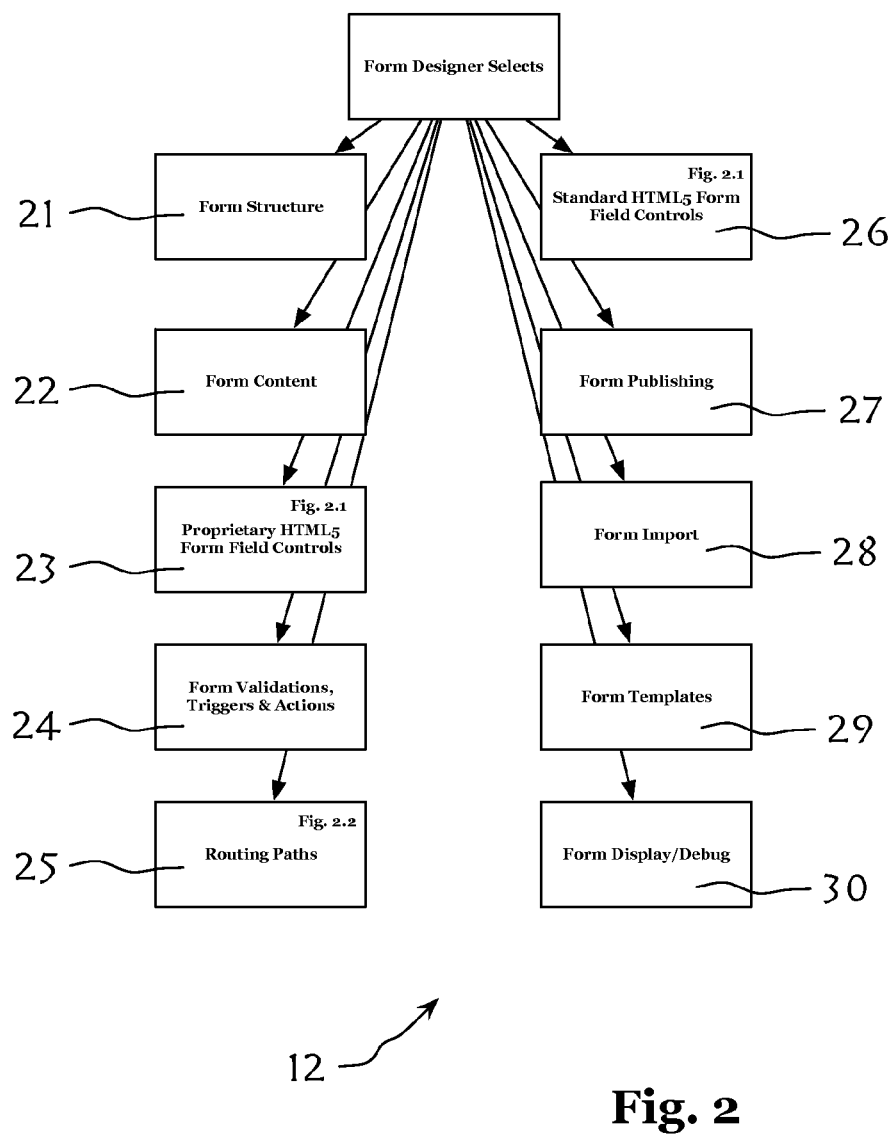
FIG. 2 is a diagram depicting the key functionality of the form designer, in accordance with one embodiment of the present invention.

In the illustrated embodiment, the system has a form designer 12 (see FIG. 1). FIG. 2 schematically illustrates the functional blocks of the form designer 12. The form designer 12 provides the functionality for allowing a form author to design and publish a form. In the disclosed embodiment, the form designer 12 may be implemented by a software program. The form designer program runs in a browser or dedicated application on a variety of computer hardware and software platforms. In an embodiment, the form designer 12 enables a form author to design (with display and debug at 20) a form to look and feel exactly as the form user would see it on paper, commonly known as WYSIWYG (What You See Is What You Get). This aids in designing the form properly and enhances form usability because it can look exactly like a paper form with which all form users are familiar. The form author uses the form designer 12 to: design the structure of the form (page size, number of pages, whether it is landscape or portrait orientation, etc.) (at 21), add form content such as text or images (at 22), create and use form field templates containing commonly used form fields such as name and address, social security number, phone number, etc. (at 29), add proprietary HTML5 form field controls (at 23) (such as the ability to display comments for a specific field, display field definitions, display an audit trail for the form, display a graphical process map including process status, etc., and add flow fields which are fields that are variable in length and contain the ability to allow fields next to it to move correspondingly on the form as the content in the flow field is added or removed), and utilize standard HTML5 form field controls (at 26). FIG. 2.1 illustrates a list of HTML5 form field controls, including both standard and user proprietary field controls.

In an embodiment, the form designer can import forms from other formats such as PDF, Microsoft Word, or HTML (at 28) and convert it accordingly including interpreting potential form fields in the document. While a form author can design a form from scratch using the form designer, importing a form will save considerable time.

Paper forms have a myriad of deficiencies including the inability to validate information entered into the form such as ensuring one and only one box in an area is checked, calculate the value of fields based on information entered into other fields such as totaling amounts on an expense report, lack of access to up-to-date values for certain form fields such as US telephone area codes, among others. To prevent these problems, the form designer 12 adds additional functionality not commonly found in paper forms, all of which enable a form user to complete a form correctly the first time they complete it, including the ability to display informational notes when a form user tabs their cursor to a form field, the ability to pull data from external database tables and external remote servers to provide up-to-date content for form fields such as a list of US telephone area codes, and real-time validations on the data entered into form fields including formulas across fields, complex calculations during form data entry, and error messages. All of this functionality is built-in to the form designer 12 of the inventive system 10 without further code level programming by users.

Existing forms system also lack much of this functionality because they assume that a code programmer is designing the form and demand that the code programmer write custom software code for any of these functions; the invention assumes that the forms will be designed by people with little to no code programming experience and has built-in functionality to accomplish these tasks. In accordance with the present invention, the form designer 12 allows a form author to design without code programming, by dragging and dropping information onto the form, complex validations of the data entered into form fields for individual or multiple fields to ensure that the form is filled out correctly, such as ensuring that a social security number is numeric and in the format XXX-XX-XXX, ensuring that all required fields are complete before a form can be submitted, or ensuring that if a certain box is checked then one of three other boxes need to be checked as well. It also allows triggers or actions to occur when a cursor is moved into a field or a field is completed, including displaying information to assist the user to properly enter information into the field.

The form designer 12 also allows form authors to graphically design routing paths (at 25) that automatically and electronically route the form to one or more form recipients for form approval or entry of additional information into the form; the routing paths can be complex and movement of forms from one form recipient to the other can be dependent on formulas that do not require code programming.

Figure 8:
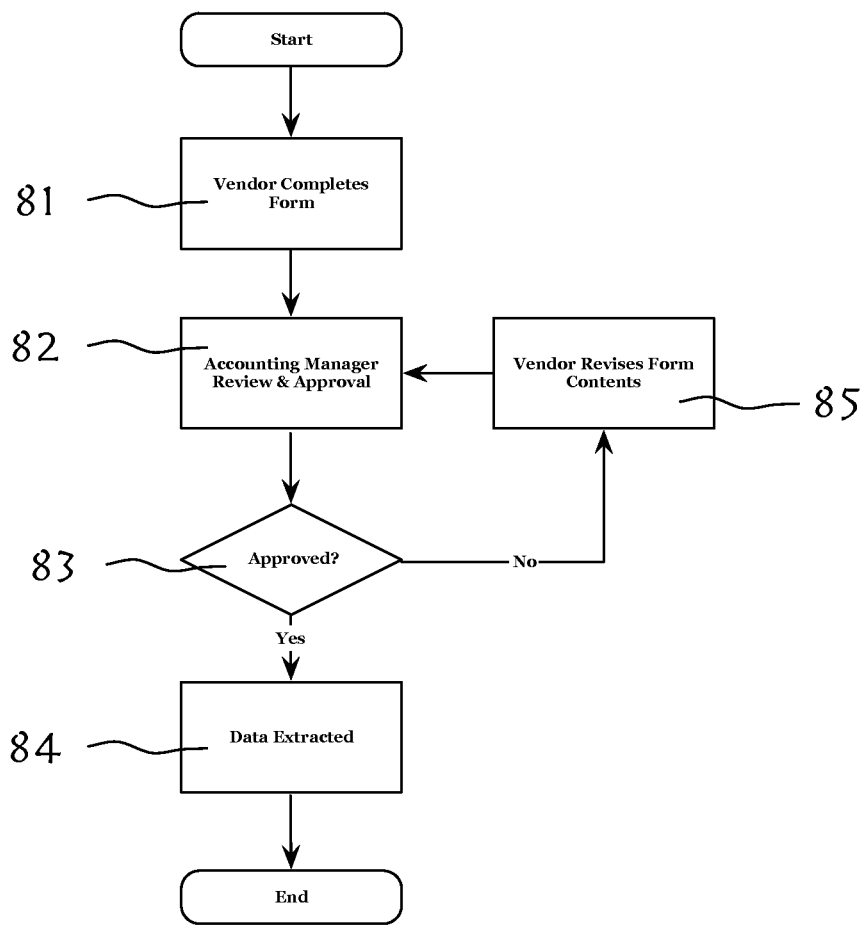
FIG. 8 is an example routing path defined for the W-9 form, in accordance with one embodiment of the present invention.

A sample routing path can be seen in FIG. 8. Steps in the routing paths can include approvals by form recipients, notifications, data extractions or other actions. FIG. 2.2 schematically illustrates the functional blocks relating to routing paths. In one embodiment, the form designer 12 allows routing paths to be copied from other existing forms (from remote server 14) to reduce the time required to design them and then modified as needed, or form author can choose to create a new routing path (at 221). Upon determination that the form author wishes to copy or clone existing routing path (at 222), the form designer 12 displays existing routing paths and form author is allowed to select one from the list (at 228). If new routing path is to be created, or for a copied routing path, the form designer 12 keeps the old routing path name or permits the form author to enter a new routine path name (at 223). The form author uses the form designer 12 to create steps for form completion (at 224) and steps for form recipient review, edit and approval as needed, including routing criteria (at 225). The form author also uses the form designer to create steps for form data extraction (at 226) and notification (at 227) as needed. In one embodiment, form authors are able to display forms in the form viewer (see FIG. 3.1) and simulate execution of the routing paths to debug the form and ensure it will work properly.

After a form has been designed using the form designer, it is ready to be published (at 27 in FIG. 2; see also FIG. 4.2). The form author submits the form to the remote server 14 for publishing (at 421 in FIG. 4.2). FIG. 4.2.1 schematically illustrates the process of form publishing. The form author publishes it by clicking on the Publish Form button (at 4211) in the form designer 12. The form designer 12 reviews the form for problems (at 4212) and notifies the form author of any problems it finds (at 4217) such as a routing path missing an end step or a field on a form that is longer than the area on the form designed for input. Once any problems have been corrected by the form author (at 4216), the form author clicks on the Publish Form button again (at 4211) and the form is uploaded to the remote server (4213). At this point, additional analysis will be required by the remote server 14; the form designer 12 presents a browser window for login to the remote server 14 (at 4214). The form author enters their password, upon which the form author is logged into the remote server, whereby another browser window opens and the form author is presented with the published form page (at 4215).

Because of the significant cost and delay that occurs when a prior and outdated version of a form is used, it is important to properly manage form versions. The system handles this automatically. The remote server analyzes a form submitted for publishing and creates/updates the version (at 422 in FIG. 4.2). FIG. 4.2.2 schematically illustrates the process of such analysis and version creation/update. Once a form has been designed and uploaded to the remote server 14, the remote server 14 analyzes the uploaded form and compares it to previously published forms to see if it is a new version of an existing form or an entirely new form (at 4221). The remote server 14 executes algorithms to determine if it is a new or old form by comparing the individual fields on the form (at 4222). For example, if more than 50% of fields on the form are different than other published forms, then the system will consider it a new form. If it is determined to be a new form, the remote server 14 asks the form author for the name of the form (at 4228). If it is determined to be an existing form (at 4222), the remote server asks the form author if form is a new version of an existing form (at 4223). If form author responses "yes" (at 4224), the form author can select the name of an existing form if it is in reality not a new form (at 4225). In an embodiment, the system allows a form author to select a dynamic name for a form such as "<Form User Name> Expense Report <Date Submitted>" which would display as "David Schnitt Expense Report Jan. 7, 2011". If it is not a new form, then it is a new version of an existing form. The remote server 14 determines if it is a major version release (e.g., 2.0 from 1.0) or minor version release (e.g., 1.1 from 1.0) by comparing the number of fields added, changed or deleted and names it accordingly (the form author can change the version manually); if more then 33% of form fields have changed it is considered to be a major version release. If form author answers "No" (at 4224), it is a new form, and the form author enters into the remote server the name of the form (at 4228). If it is a new version of an existing form, the remote server automatically assigns an updated version number to the form (at 4226). The form author could also be given an opportunity to manually change the form version number as needed (at 4227).

Once the version is determined, the remote server 14 publishes the form (at 423 in FIG. 4.2). FIG. 4.2.3 schematically illustrates the process of publishing. Remote server 14 publishes the form and disables prior versions of the form (at 4231). The form author can also delete from the remote server prior versions of the form and data as needed (at 4232). The remote server prompts the form author to select the form users that the form should be published to (at 4233), and the form author may respond with identifications of individuals or groups of form users (at 4234). The form author can select notifications to the form users of the new version (at 4235), if desired, and the remote server notifies the form users via email that a new version of the form is available (at 4236) (and may or may not attach the new form to the email).

Along with form publishing, the remote server 14 creates/updates a database (at 424 in FIG. 4.2). FIG. 4.2.4 schematically illustrates the process of database creation and update. The remote server displays the database structure based on the form design (at 4241) and allows the form author to modify it as needed (4242). If there are new form fields (determined at 4243), the remote server 14 automatically creates the database structure and otherwise updates the database structure based on any new form fields (at 4248). Further, if there are deleted form fields (determined at 4244), the remote server 14 automatically removes any deleted form fields from the database structure (at 4248), unless the deleted form fields have data from old versions of the form submitted earlier (determined at 42401), at which instance the remote server automatically retains the deleted form fields in the database with data (at 42402). Further, if there are any changed form fields (determined at 4245), the remote server 14 automatically changes any form fields that have changed (at 4240). For example, the remote server 14 automatically moves data in old form fields to new form fields and reformats data as needed. The remote server inherits any data extract parameters from prior versions of the form, publishes the database structure (at 4246), and automatically deletes any prior versions of the form and data as needed (at 4247).

In one embodiment, the form author determines data extract parameters as needed during form publishing (at 425 in FIG. 4.2). FIG. 4.2.5 schematically illustrates the process of how the remote server 14 selects data extract parameters for automatic extraction by the remote server 14. This is required if the form data needs to be exported into an external system, which is often the case. One of the key benefits of electronic forms is the fact that the data resides in a database and can be transmitted to an external system versus requiring a person to enter data from the form into a separate, external system, which would be a duplicate entry of form information. Existing forms systems again assume a code programmer is designing the form and therefore will write a code program to pull data from the database into an external system; the invention assumes a non-code programmer is designing the form.

The remote server 14 identifies potential data extract methods (at 4250). On a series of web pages made available by the remote server 14, the form author first selects the potential data extract methods such as a flat file, SQL database, stored procedure or web service identified by the remote server 14 (at 4255). The remote server 14 next identifies (at 4251) and the form author next views a list of form fields available for export including the characteristics of those fields such as field length, field type (numeric, alphanumeric, date, etc.), etc. and chooses (at 4256) the fields to be exported along with any transformations required by those fields such as numeric transformations (addition, subtraction, etc.), text transformations or other transformations. The remote server 14 next identifies (at 4252 and 4253) and the form author next selects possible extract formats such as CSV, excel, text, PDF, etc. (at 4257), and the extract frequencies (upon form submission, hourly, daily, etc.) (at 4258). Lastly, the remote sever 14 identifies (at 4254) and the form author selects (at 4259) the mechanism used to send the file to the other system such as FTP, secure FTP, etc. Based on these parameters, data is automatically sent to an external system when forms are submitted to the remote server 14.

In one embodiment, the remote server 14 automatically sends out notifications to form users and form recipients as system events occur such as forms submitted, forms routed to user's inboxes, etc. (see, e.g., block 4236 in FIG. 4.2.3, in which remote server 14 notifies form users of new version based on settings). The system has many default notifications for these events but also allows form authors to change the content of these notifications as well as add new notifications based on criteria for their company as well as for individual forms. FIG. 4.3 schematically illustrates the process of establishing notifications. When logged into the remote server 14, the remote server displays (at 431) and the form author can view notifications, each of which has a name. The form author can create a new notification from scratch and/or select an existing notification (at 432), and add, change or delete the content of the notification (at 433), for example change the content of the notification including email subject, message text and formatting. Notifications can take a variety of formats including emails, SMS/MMS messages, phone calls and other types of audio, visual and/or textual formats.

Form User/Viewer

Figure 3:
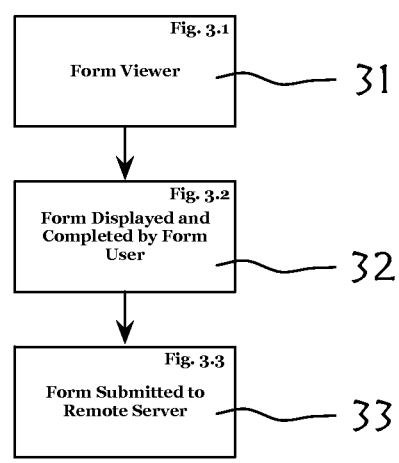
FIG. 3 is a high level diagram depicting the key steps required for a form user to view and/or complete a form utilizing the system, in accordance with one embodiment of the present invention.
Figure 3:

The form user is someone that completes a form using the form viewer either online or offline. (It is noted that a form user, a form author and a form recipient may be the same person or different persons; references to form user, form author and form recipient throughout herein are in relation to the particular related functions accomplished by the particular individuals.) For example, a form author who creates a form to choose health insurance for her employer company will need to fill out the same form as a form user, and may further need to review the form as a form recipient. FIG. 3 schematically illustrates the process undertaken by the form user to use the form viewer 13 (at 31) to submit a form to the remote server 14. The form viewer 13 is a platform-independent program that automatically opens when a form user clicks on a form file or visits a specified web page that has an embedded copy of a form (at 32). Upon completion of working with the form, the form user submits the form via the form viewer 13 to the remote server 14 (at 33; also explained above in connection with form publishing).

In one embodiment, the form viewer 13 stores forms and their content in a storage format that includes the form content such as the WYSIWYG image of the form, form controls, text, graphics, and form field values, among others. It consists of a computer program used to display (at 318) the form utilizing the HTML5 standard which makes it browser independent or a viewer (at 318 and 319) built for a dedicated platform such as an Apple iPad or to handle older technologies such as Microsoft's Internet Explorer 6.

In one embodiment, the HTML5 standard has been enhanced by the system 10 to provide functionality including proprietary form field controls (at 313, also see FIG. 2.1) such as balloons, information boxes, and other controls (at 316 and 317). As the form is completed by the form user, the form viewer 13 also executes any validations or calculations embedded into the form by the form author when they designed the form using the form designer 13. Other proprietary HTML5 behaviors have been built into the system 10 (see, FIG. 3.1.1), including the ability for the form viewer to, for example, notify and highlight to the form user problems with the form, graphically display the routing path used for the form including the current status of the form, and display a time and date-stamped audit trail of the form, showing problems, comments, and form users at each step of the routing path.

A common problem with paper forms is that it is difficult to prevent people from using old versions of a form when a new version is created. Many forms go through an iterative process where a form is distributed and is revised based on errors people make in completing the form, e.g., a new version may display boxes to designate how many characters a certain field contains such as a social security number to ensure form users complete the field with the correct number of digits or add a new field to make it easier for form users to complete the form properly. Again, because of the decentralized nature of existing forms systems, they do not envision this issue and allow prior versions of forms to be submitted. The invention solves this problem since the remote server 14 has logic to keep track of new versions of forms and the form viewer automatically checks with the remote server to see if there is a new version of the form when a form is opened. If a new version is available, it downloads and replaces it with the new version automatically (and thereby prevents the form user from filling out an old version of the form); if there was data saved in the old version of the form, the form viewer 13 moves the data to the appropriate fields in the new version both on the form and in the database on the remote server. See also earlier discussions of remote server update form versions in connection with FIGS. 4.2.2 and 4.2.4.

FIG. 3.2 schematically illustrates the process of the form viewer displaying a form. When a form user receives a form either as a file on their computer or as a download from a website, the form and data are displayed by the form viewer 13 (at 321). The form viewer 13 also displays form comments and exceptions (at 322). The form user views the form with the form viewer and completes it either online or offline by entering data into the form fields (at 323). The form automatically validates the data entered into the form based on the form design published by the form designer. The form user can save a partially completed form to their computer as a version of a file utilizing the storage format or to the remote server 14 for completion at a later date.

FIG. 3.3 schematically illustrates the process of form user submitting completed form. When the form user has fully completed the form, they can click on a dedicated button in the form viewer toolbar to submit the form (at 331) which transmits form data to the remote server 14 (at 332). In one embodiment, based on the form user's or form author's preferences established with the centralized and unified electronic forms management system 10 and remote server 14, a receipt of the form is emailed to the form user including a PDF copy of the form submitted (at 333).

Referring to FIG. 4.4, at the remote server 14, once a form user has completed entering information into a form and submitted via the form viewer 13 (at 442; see also FIG. 4.4.1), the form data is stored in the database 17. Referring to FIG. 4.4.1, after the form user clicks on the submit button in the form viewer 13, if the form failed any validations designed into the form (at 4412), the form user is notified (at 4416) and asked to fix the problems (at 4415) before trying to attempt to submit the form again. Once corrections have been applied and completed, the form user clicks on the Submit button again (at 4411) and the form data is transmitted to the remote server 14 along with the company name, form user name, form name and form version (at 4413). When the remote server 14 receives a submitted form, it automatically assigns a unique identification number to the form so it can be tracked in the server database (at 4414).

Database

Referring to FIG. 4.4.2, the form data is stored in the database 17 on the remote server 14 (at 4421) and an audit trail for the form is initiated and stored in the database for the life of the form instance including the form user, date and time submitted, and the submission source, e.g., online submission (at 4422). In an embodiment, the remote server 14 sends any receipt notifications if designed to the form user so they know their form has been received successfully (at 4423).

Form Routine to Recipient

If the form has been designed to be routed for approval or for input of additional information by a different person (i.e., form recipients 15) than the form user using routing paths, these are initiated after the form has been successfully submitted to the remote server 14. Referring to FIG. 4.5, the remote server 14 electronically and automatically routes the form to form recipients 15 based on the routing path designed for the form in the form designer, sends notifications that the form has been sent to the form recipient's inbox, and records in the audit trail for the form (together with the date and time it occurred) all of this information including routing of the form to each step, the before and after content of any fields changed, each notification, approvals or rejections, and field or form comments, among others (at 451).

Figure 5:
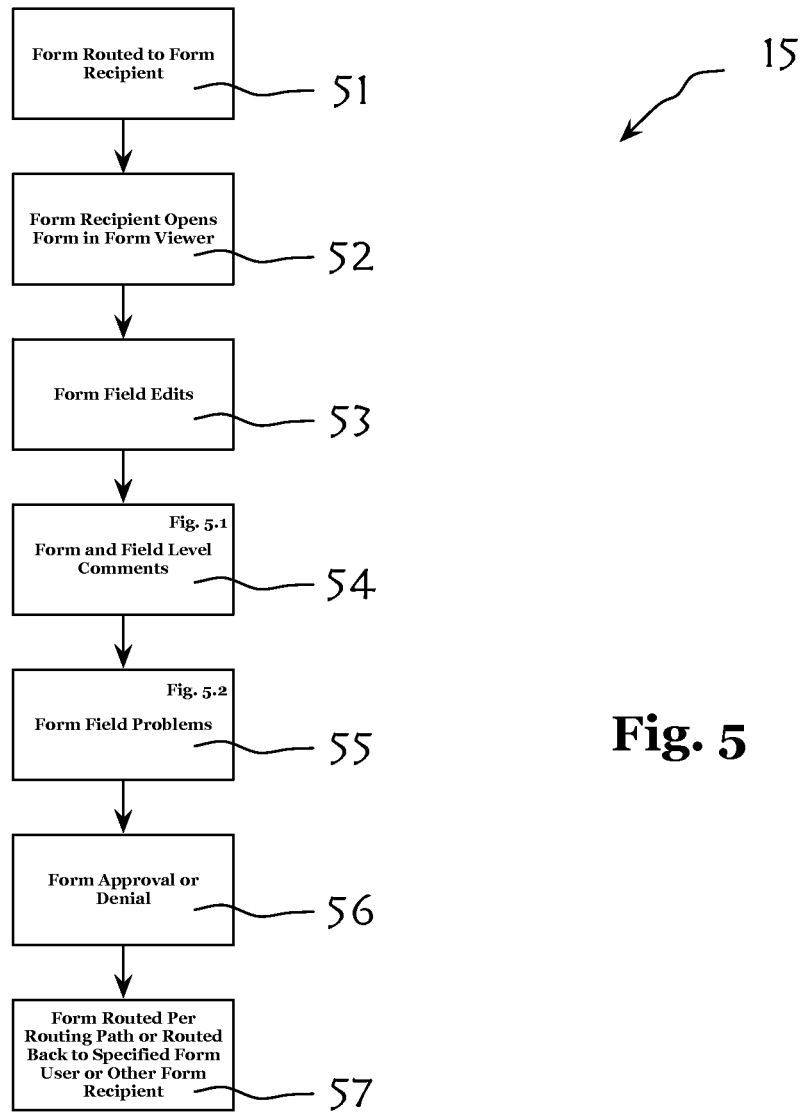
FIG. 5 is a diagram depicting the steps required for a form recipient to receive, complete and/or approve a form and route it to other form recipients or back to the form user, in accordance with one embodiment of the present invention.

Referring also to FIG. 5, which illustrates the process followed by the form recipient 15 consistent with the form routing process in FIG. 4.5, when the form is routed to the form recipient and the form recipient receives a notification (at 451 and 51), the form recipient clicks on a link in the notification they received or logs in to the remote server to their inbox to view the form (at 452 and 52). The form is opened up in the form viewer which displays the form and its contents including any comments made previously and also highlights any form fields with problems (at 453). The form recipient can change the data in any form field (at 53), for example to resolve a problem, and this is recorded in the audit trail so any viewers of this form can see that the form recipient changed its contents. The form recipient can enter any comments (at 54 and 454; see also FIG. 5.1) at either the form level or an individual field level as well as select fields with problems from a drop down list, the problem with the data in the field from a drop down list and enter any comments about the problem as needed (at 55 and 456; see also FIG. 5.2). (More specifically, in the illustrated embodiment of FIG. 5.1, concerning form and field level comments, form recipient selects the overall form or a specific field for comments (at 511). The form recipient enters free-form comments or selects from an existing list of comments (at 512). The remote server 14 date and time stamps each entry and adds it to the audit trail (at 513). In the illustrated embodiment of FIG. 5.2, form recipients select specific fields as a problem (at 521), and enter free-form comments or select from an existing list of comments (at 522), followed by the remote server 14 date and time stamps each entry and adds it to the audit trail (at 523).) Additionally, the form recipient can approve or disapprove the form (at 56 and 457) if this has been selected as a function within the form.

If the form is determined (at 458) that an additional form recipient needs to view the form as part of the routing path, then the form is automatically sent electronically by the remote server 14 to that form recipient's inbox and the process begins again (at 57 and 455). However, if the form was approved and this form recipient was the last recipient in the routing path (determined at 458), the form recipient clicks the Complete button (at 459) and the remote server 14 assigns the form a status of Completed and the form data is stored in the database by the remote server 14 (at 450).

Forms can also be routed back to the original form user that submitted the form to ask for additional or corrective information as needed. Paper forms as well as existing form systems do not have the ability to track who made changes to the forms once submitted. This can be a problem because it is unclear whether the changes came from the form user or from someone else involved in the process to truly understand the authenticity of the form's contents. Since the invention provides a full audit trail, the authenticity of the information is fully documented and quickly understood.

External Database

Most forms are completed to provide information that needs to be entered into one or more back-end systems as part of a larger business process. For example, a payroll form that documents changes to an employee's address provides information that needs to be entered into both human resources and payroll systems. If paper forms are used, the data from each form needs to be manually entered into the system which is time consuming and expensive. If there is an existing forms system, a code programmer needs to map the database from the forms system to the back end system and write custom program codes to translate the data from the database into a format required by the back end system. The code programmer also needs to develop a way to transmit the data to the back end system. This can be quite expensive. In one embodiment, the invention provides a way for a non-code programmer to extract data and send it to a back end system without software code programming.

Referring to FIG. 4.6, once the data has been stored in the database by the remote server, it can be extracted either automatically (at 461) or manually (at 462) by the form author or any other remote server user. The user can select (at 463) reporting (at 464; see also FIG. 4.6.2). Referring also to FIG.

4.6.1, if data extract parameters have been defined for the form, automatic data extraction occurs by the remote server based on those parameters (at 4611) and the data is transmitted by the remote server 14 based on those parameters and frequencies to the recipient system (at 4612). Alternatively, a form author can manually extract data while logged on to the remote server from the database for the form in much the same way that a form author can specify automatic extraction as shown in FIG. 4.2.5. Specifically, the user can interact with the remote server 14 (e.g., via a web page) by selecting similar parameters (e.g., as those shown in FIG. 4.2.5) for a one-time data extraction.

A form author utilizes the remote server 14 to manually extract data from the database according to the data extract parameters defined by the form author.

Referring to FIG. 4.6.2, upon user selection (at 4621) a form author can create views of the data in the database for the form on the remote server 14 and download those reports into a variety of formats such as excel, PDF and others (at 4622). The remote server 14 also allows form authors to generate reports and perform online inquiry showing form status and form data, including a graphical process map with associated form statistics for both form authors and form users.

Overall System and Process Flow

Figure 6:
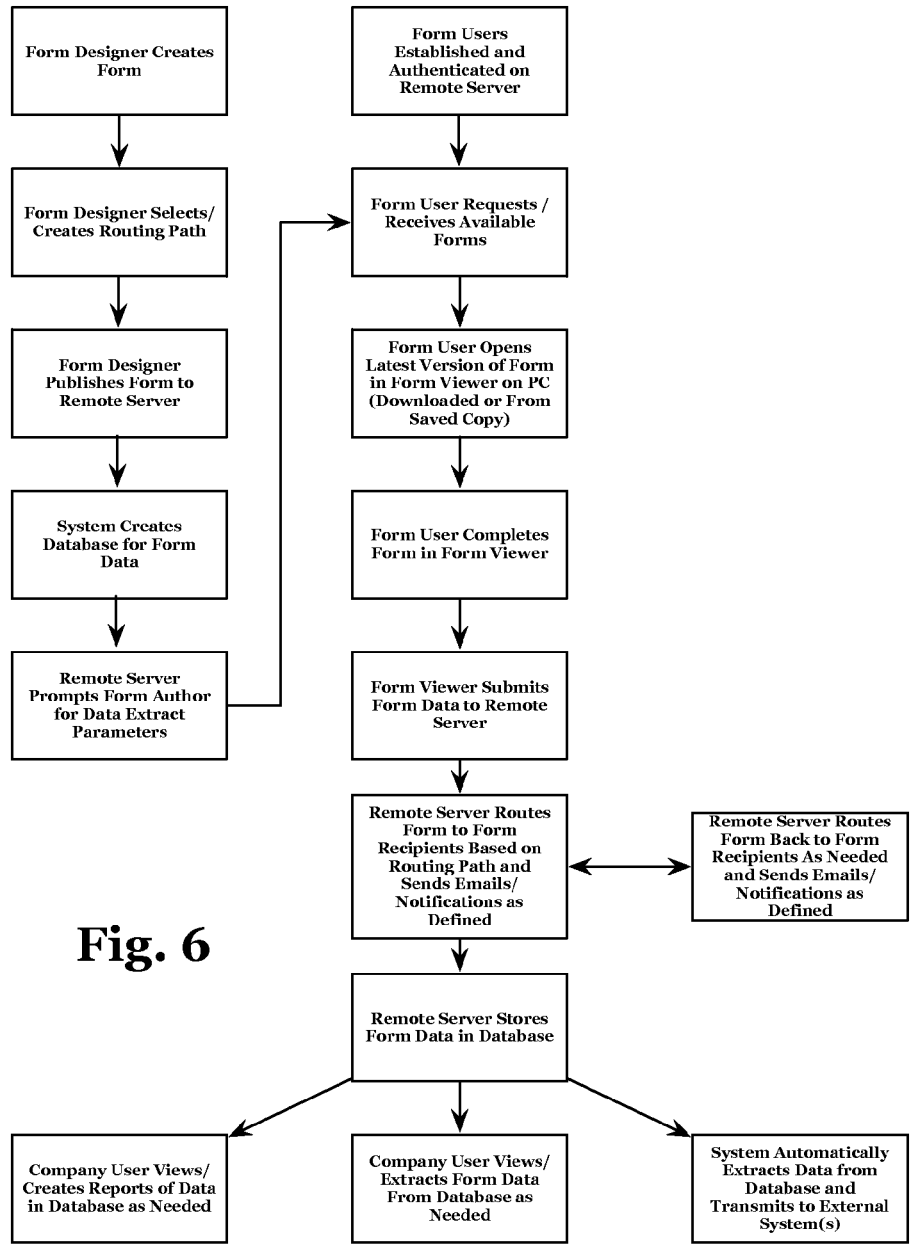
FIG. 6 is a process-view diagram depicting the steps from form design and publishing to form user receipt and completion of the form, submission of the form, routing of the form to form recipients, storing form data in the database and extracting and/or reporting on form data, in accordance with one embodiment of the present invention.

The above described modules are combined to deliver the unified electronic forms management system and process of the present invention. FIG. 6 shows a high level overall process view supported by the unified system of the present invention, from form design and publishing, to form user form completion and submission, to electronic routing to form recipients by the remote server, storage of form data in the database by the remote server, automated data extraction by the remote server based on data extract parameters, manual extraction on the remote server, and reporting on the remote server. Each of the functional blocks illustrated in FIG. 6 may combine one or more functional blocks disclosed in the figures discussed above. Reference is made to the earlier detailed discussions above. Given the clear description of the functions of each block in FIG. 6, further discussion of the functional blocks in FIG. 6 is not required.

Example

A real-world example will demonstrate the usefulness of the invention, in reference to reporting of U.S. federal tax form 1099. Starting in 2012, all companies in the United States have new requirements for 1099 reporting for their vendors. The 1099 is a report that is a summarization of the total amounts paid to a vendor in a given year; it is a report that needs to be generated and sent to the government annually with a copy for the vendor. Historically, companies were only required to report payments to vendors that are individuals or sole proprietors for services rendered. To properly report this to the government (and to their vendors) they had to obtain a valid W-9 form from each vendor; the W-9 form came from the vendor and documented their type of business entity (corporation, sole proprietor, etc.) and taxpayer ID number. However, starting in 2012, companies are required to perform this same reporting for all vendors that they pay more than $600 in a year; for most companies this will mean that they will be required to obtain W-9 forms from 4 to 5 times as many vendors as they needed to historically. In addition, the IRS has created a new version of the W-9 form because more detailed information is required for the new reporting standards. This means that companies will most likely need to obtain a new W-9 form from all of their vendors.

Most companies will undoubtedly mail a copy of the new W-9 form to each one of their hundreds or thousands of vendors. Once the vendor has returned the completed forms, they will review each one for completeness and contact those vendors that did not complete the form correctly or missed certain form fields. Because it is a paper form, the risk of incorrectly or partially completing the form is high. They will also manually log each form received and completed so they know which vendors have not sent back their forms. Completed forms will be approved and sent to a clerk for input or update of the vendor's W-9 information into their accounting system so accurate reports can be generated out of the accounting system at the end of each year. This is obviously time consuming and expensive because of the significant labor required and the cost of mailing and processing of the forms.

Alternatively a company could develop a web page which has an embedded copy of the PDF version of the W-9 form on it but they would have no way to extract data from such a form and would need a clerk to enter the information into their accounting system manually anyway. This would only save postage and so would be more expensive than the paper option. The PDF version of the W-9 form from the government allows someone to complete the form online but contains no validations, so the risk of incorrectly or partially completing the form is just as high as the paper version of the form. And even though it can be completed online, it still needs to be printed and signed manually since it requires a signature and date.

The company could also ask a software code programmer to develop a web page or use a forms system to capture the information required on the W-9 form with appropriate validations to ensure the form was completed correctly, develop a module to allow vendors to login and authenticate themselves, build a database to capture and store the information, build a report to print the information captured for review by someone to ensure the information is complete and accurate and then develop a custom code program to extract data from the database and upload it to their accounting system. Since the cost of a code programmer is many times that of a clerk and the code programming effort is significant, it would probably cost more than the paper option. It is doubtful this would make sense for a form that needs to be filled out by a vendor only once. And if the form changed, the web page would need to be redesigned and the information gathering process started all over again.

However, the invention can solve all of these problems. The invention allows a form author to import the PDF version of the W-9 form from the IRS and add several validations to the form without code level programming by the form author. The form author can then design a routing path for the completion and submission of the W-9 form by the vendor (see, e.g., the embodiment of FIG. 8). For example, the form author can drag and drop process steps that define an approval step whereby a manager can review and approve a submitted form. Also the form author can design data extract parameters, again by dragging and dropping fields into the form designer. The form author could design a notification email to be sent to all vendors that asks them to complete the W-9 form. Lastly, the form author can upload a list of all vendors from the accounting system including their email addresses. This entire process will take in less than a few hours and will not require any programming time by a programmer at a code level.

FIG. 8 schematically illustrates an embodiment of a high level routing path in connection with a vendor completing and submitting a W-9 form to a company (some details have been omitted from this figure and discussions below, given the earlier detailed discussions). When initiated by the form author, each vendor will receive an email notification from the remote server asking them to complete the attached form. Each vendor will login to the remote server to authenticate themselves by answering a series of challenge questions, open the form in the form viewer which executes in their browser and complete the form online or offline (at 81). The form will be validated during data entry to ensure that the form has been filled out properly. Since the vendor already authenticated themselves, no signature will be required. Once complete, the form user will click the submit button and the form would be sent to the remote server and the data will be stored in the database on the remote server. The remote server will then send an email notification to the approver (e.g., an accounting manager) who can click on a link in the email or logon to the remote server and view each one of the W-9 forms in their inbox. If the approver sees an error on the form they can correct it themselves or route it back to the form user at the vendor with a question or comment specific to that errant field or the entire form; the form user can make the correction on the form and resubmit it (at 85). If the approver wants to approve the form (at 83), they will click on the approve button, the form's data will be stored in the database, extracted from the database and uploaded to the accounting system (at 84) per the schedule determined during design of the data extract parameters.

The form author can generate reports out of the remote server that show the number of forms sent, the number received but not approved (and where they are in the process audit trail), and the number successfully uploaded into the accounting system. Alternatively, the form author can simply generate a report of outstanding forms. Armed with this information, the form author can ask the remote server to resend the email notification to those vendors that did not submit a form to ensure full compliance.

Finally, if the W-9 form changes again, the company would import the new version or redesign the form and it would automatically be updated for any vendor that attempts to complete the form.

Figure 7A:
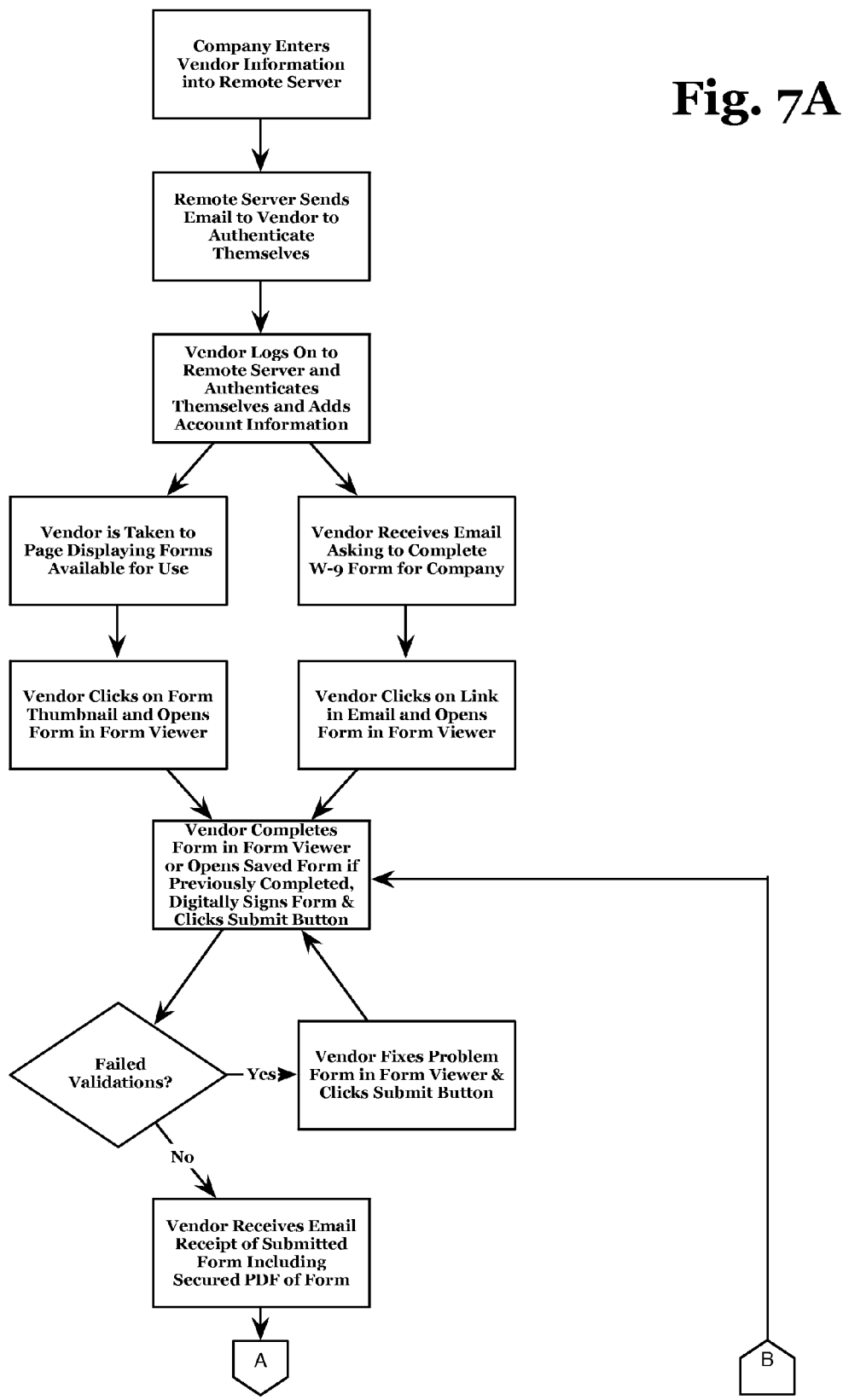
FIGS. 7A and 7B illustrate a process-view diagram depicting an example for a W-9 form process, in accordance with one embodiment of the present invention.
Figure 7B:
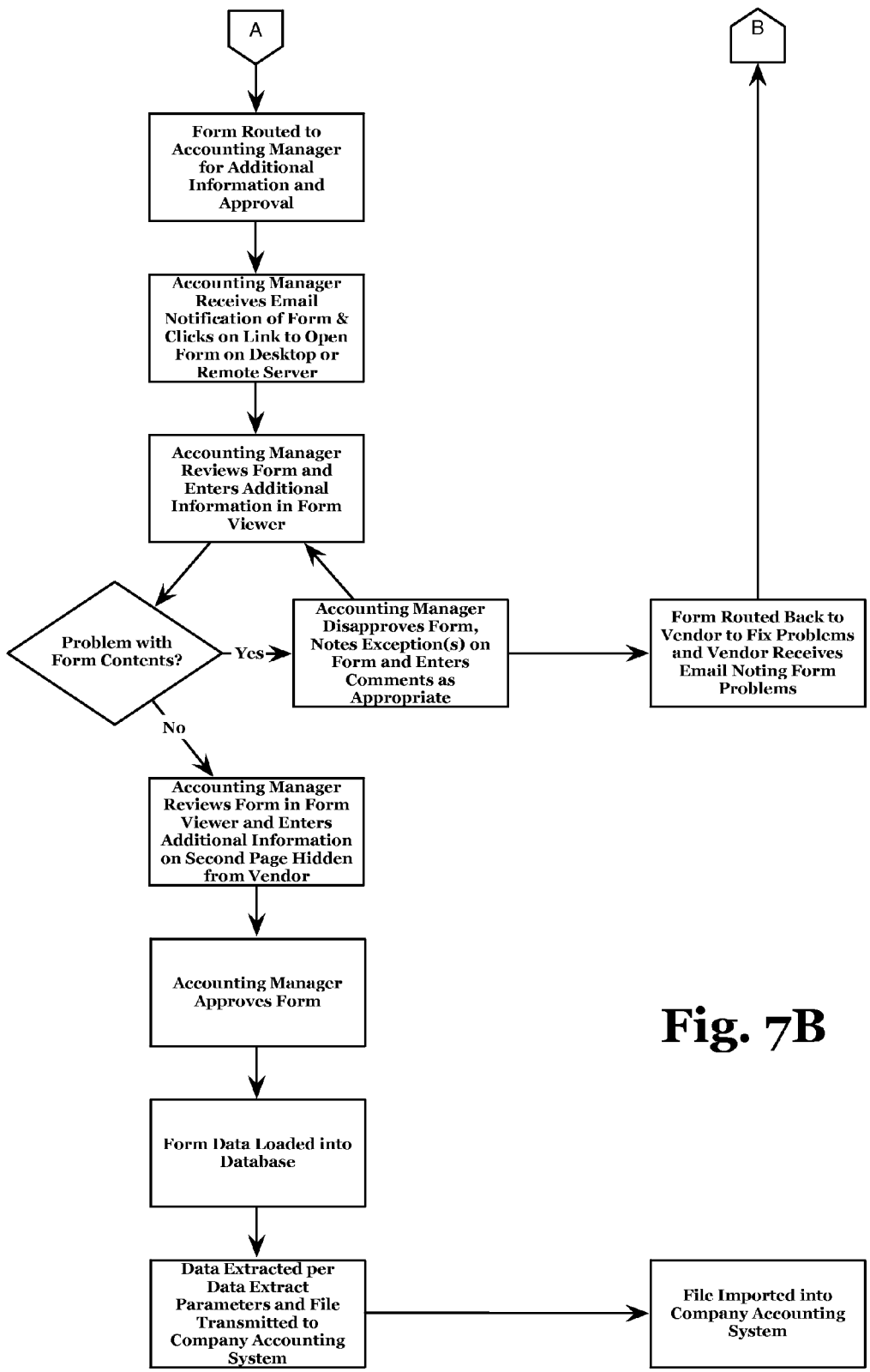

FIGS. 7A and 7B illustrate a more detailed process flow diagram depicting the exemplary W-9 form process consistent with the routing path illustrated in FIG. 8 in connection with the unified system of the present invention. Each of the functional blocks illustrated in FIGS. 7A and 7B may combine one or more functional blocks earlier disclosed in the figures discussed above. Given the clear description of the functions of each block in FIGS. 7A and 7B, further discussion of the functional blocks in FIGS. 7A and 7B is not required. In particular, FIGS. 7A and 7B do not specifically cover the form creation process, but cover the process in relation to company's undertaking concerning routing of forms to vendors, vendors' completion and submission of forms, review and approval of the submitted forms, and extraction of form data and storage of form and data into database.

In this example, the invention solved all of the problems commonly encountered with paper forms as well as web forms and existing forms systems.

The process and system of the present invention has been described above in terms of functional modules in block diagram format. It is understood that unless otherwise stated to the contrary herein, one or more functions may be integrated in a single physical device and/or software module in a software product, or one or more functions may be implemented in separate physical devices and/or software modules at a single location or distributed over a network, without departing from the scope and spirit of the present invention.

It is appreciated that detailed discussion of the actual implementation of each module is not necessary for an enabling understanding of the invention. The actual implementation is well within the routine skill of a programmer and system engineer, given the disclosure herein of the system attributes, functionality and inter-relationship of the various functional modules, hardware and software components in the system. A person skilled in the art, applying ordinary skill can practice the present invention without undue experimentation.

While the invention has been described with respect to the described embodiments in accordance therewith, it will be apparent to those skilled in the art that various modifications and improvements may be made without departing from the scope and spirit of the invention. For example, the various electronic form applications can be easily modified to incorporate different or additional processes to provide additional user flexibility in connection with creating and managing electronic forms and form information. Accordingly, it is to be understood that the invention is not to be limited by the specific illustrated embodiments, but only by the scope of the appended claims.

I claim:

1. A unified electronic form management system, comprising:
  a server managing storage of electronic forms and form data, automatic updating of new versions of the electronic forms independent of form data, automatic distribution of updated versions of electronic forms in WYSIWYG format wherein the electronic forms distributed to user are current version independent of user request, and user access to the electronic forms, wherein the server interacts with at least (a) a form author who submits an electronic form in WYSIWYG format to the server and (b) a user who accesses the server to retrieve the electronic form, displays the electronic form in WYSIWYG format, interacts with the electronic form including data entry, and submits the electronic form with form data to the server; and
  a database associated with the server, storing the electronic form in WYSIWYG format,
  wherein the server automatically updates form data in the current version of the electronic form based on updated form fields compared to preceding version.

2. The unified electronic form management system as in claim 1, further comprising a form designer interacting with the server to create the electronic form in WYSIWYG format, wherein the form designer provides tools that are used by a form author to create the electronic form in WYSIWYG without requiring code programming.

3. The unified electronic form management system as in claim 2, wherein the form designer further provides tools that are used by the form author to pre-define a routing path associated with the electronic form to specify the order of routing the electronic form based on associated criteria without requiring further code programming.

4. The unified electronic form management system as in claim 2, wherein the form designer communicates with the server over a data network.

5. The unified electronic form management system as in claim 1, further comprising a form viewer used by a user to access the electronic form from the server, display the electronic form in WYSIWYG format, and complete and submit the electronic form to the server.

6. The unified electronic form management system as in claim 5, wherein the form viewer utilizes HTML5 standard to display and provide user interaction with the electronic forms in WYSIWYG format.

7. The unified electronic form management system as in claim 5, wherein the server automatically tracks the current version of the electronic form, and automatically provides the current version of the electronic form to the form viewer.

8. The unified electronic form management system as in claim 7, wherein the server automatically provides the current version of the electronic form with the updated form data to the form viewer.

9. The unified electronic form management system as in claim 8, wherein the server further automatically distributes an updated version of the electronic form to users who have already been previously authenticated.

10. The unified electronic form management system as in claim 5, further comprising a form designer interacting with the server to create the electronic form in WYSIWYG format, wherein the form designer provides tools that are used by a form author to create the electronic form in WYSIWYG without requiring code programming.

11. The unified electronic form management system as in claim 1, wherein the remote server communicates with a plurality of form authors and users from different organizations, and wherein the server centrally manages and tracks activities relating to electronic forms in connection with form authors and users across multiple organizations.

12. The unified electronic form management system as in claim 1, wherein the remote server allows the user to access any electronic form authorized to the user once the user has been authenticated by the server, and the user can submit electronic forms with form data without requiring further authentication by the server.

13. A unified electronic form management system, comprising:
a server managing storage of electronic forms and form data, automatic updating of new versions of the electronic forms independent of form data, automatic distribution of updated versions of electronic forms in WYSIWYG format, and user access to the electronic forms, wherein the server interacts with at least (a) a form author who submits an electronic form in WYSIWYG format to the server and (b) a user who accesses the server to retrieve the electronic form, displays the electronic form in WYSIWYG format, interacts with the electronic form including data entry, and submits the electronic form with form data to the server;
a database associated with the server, storing the electronic form in WYSIWYG format; and
tools that are used by the form author to pre-define a routing path associated with the electronic form to specify the order of routing the electronic form based on associated criteria without requiring further code programming, wherein the pre-defined routing path includes at least one other user, and the server automatically routes the electronic form to the at least one other user according to the pre-defined routing path for further input by the at least one other user.

14. The unified electronic form management system as in claim 13, wherein the form author further defines data extraction parameters to extract data from one database system to another database system, wherein the unified form management system further provides tools that are used by the form author to define the data extraction parameters without requiring further code programming, and wherein the server extracts data from the electronic form based on the defined data extraction rules.

15. The unified electronic form management system as in claim 14, wherein the data extraction parameters include one of more of data extraction methods, fields and related characteristics, extraction formats, extraction frequencies and transmission methods based on defined transmission types without requiring code programming.

16. A process of unified management of electronic forms, comprising:
providing a server that manages storage of electronic forms, automatic updating of new versions of the electronic forms independent of form data, automatic distribution of updated versions of electronic forms in WYSIWYG format wherein the electronic forms distributed to user are current version independent of user request, and user access to the server;
providing user access to the server to electronic forms, wherein at least (a) a author submits an electronic form in WYSIWYG format to the server and (b) a user who accesses the server to retrieve an electronic form, displays the electronic form in WYSIWYG format, interacts with the electronic form including data entry, and submits the electronic form to the server with form data; and
storing the electronic form in WYSIWYG format,
wherein the server automatically tracking the current version of the electronic form, and automatically updating form data in the current version of the electronic form based on updated form fields compared to preceding version.

17. The process of unified management of electronic forms as in claim 16, further comprising providing a form designer interacting with the server to create the electronic form in WYSIWYG format, wherein the form designer provides tools used by the form author to create the electronic form in WYSIWYG without requiring code programming.

18. The process of unified management of electronic forms as in claim 17, wherein the electronic form is routed over a data network according to a pre-defined routing plan defined using the form designer.

19. The process of unified management of electronic forms as in claim 16, further comprising the server automatically providing the current version of the electronic form with the updated form data to the user.

20. The process of unified management of electronic forms as in claim 16, wherein the server communicates with a plurality of form authors and users from different organizations, and wherein the server centrally manages and tracks activities relating to the electronic forms in connection with form authors and users across multiple organizations.

21. The process of unified management of electronic forms as in claim 16, further comprising defining data extraction parameters to extract data from one database system to another dissimilar database system at the time the electronic form is created by the form author, and server extracting data from the electronic form based on the defined data extraction rules.

22. The process of unified management of electronic forms as in claim 16, wherein the remote server allows the user to access any electronic form authorized to the user once the user has been authenticated by the server, and the user can submit electronic forms with form data without requiring further authentication by the server.

* * * * *